Dec. 2, 1952   E. E. HOSEA   2,619,880
MACHINE TOOL
Filed Sept. 9, 1946   16 Sheets-Sheet 1

INVENTOR:
EVERETT E. HOSEA
BY Carlson, Pitney, Hubbard & Wolfe
ATT'YS

Dec. 2, 1952      E. E. HOSEA      2,619,880
MACHINE TOOL
Filed Sept. 9, 1946      16 Sheets-Sheet 2
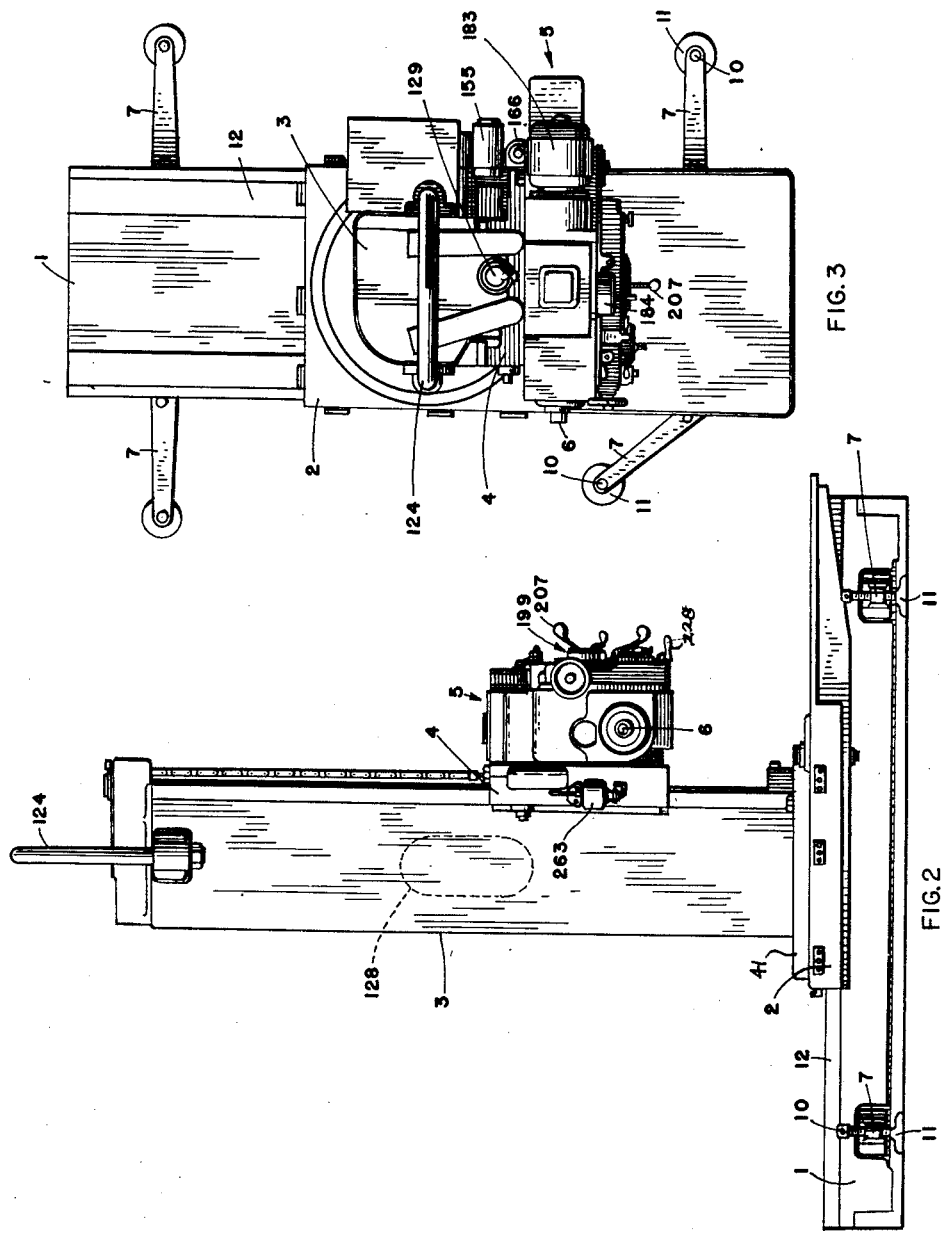
INVENTOR:
EVERETT E. HOSEA
ATT'YS Dec. 2, 1952      E. E. HOSEA      2,619,880
MACHINE TOOL Filed Sept. 9, 1946      16 Sheets-Sheet 3

INVENTOR:
EVERETT E. HOSEA

BY Carlson, Pitzner, Hubbard & Wolfe

ATT'YS

Dec. 2, 1952  E. E. HOSEA  2,619,880
MACHINE TOOL
Filed Sept. 9, 1946  16 Sheets-Sheet 4
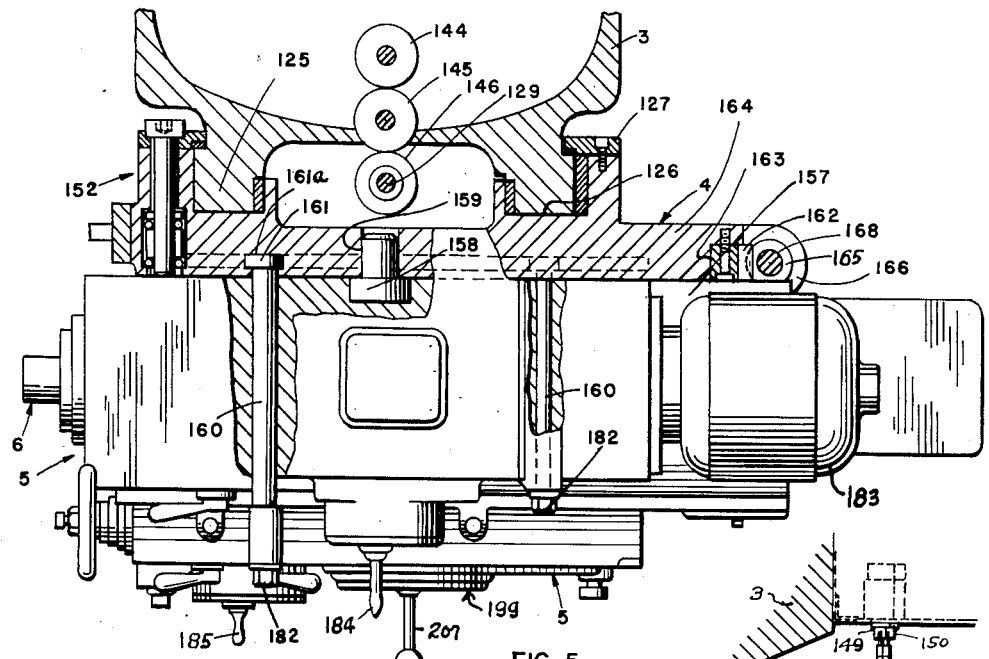
FIG. 5
FIG. 5a
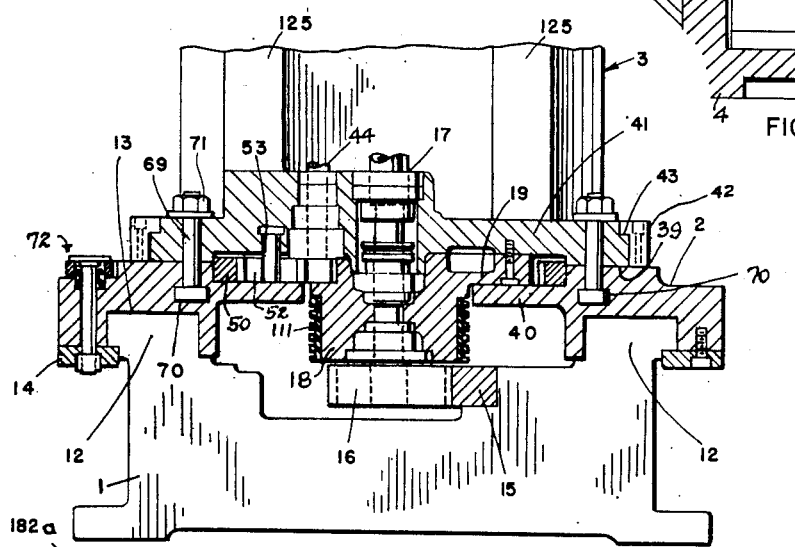
FIG. 6
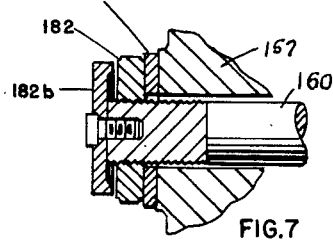
FIG. 7
INVENTOR:
EVERETT E. HOSEA
BY Carlson, Pitzner, Hubbard & Wolfe
ATT'YS

INVENTOR:
EVERETT E. HOSEA

Dec. 2, 1952 E. E. HOSEA 2,619,880
MACHINE TOOL
Filed Sept. 9, 1946 16 Sheets-Sheet 6
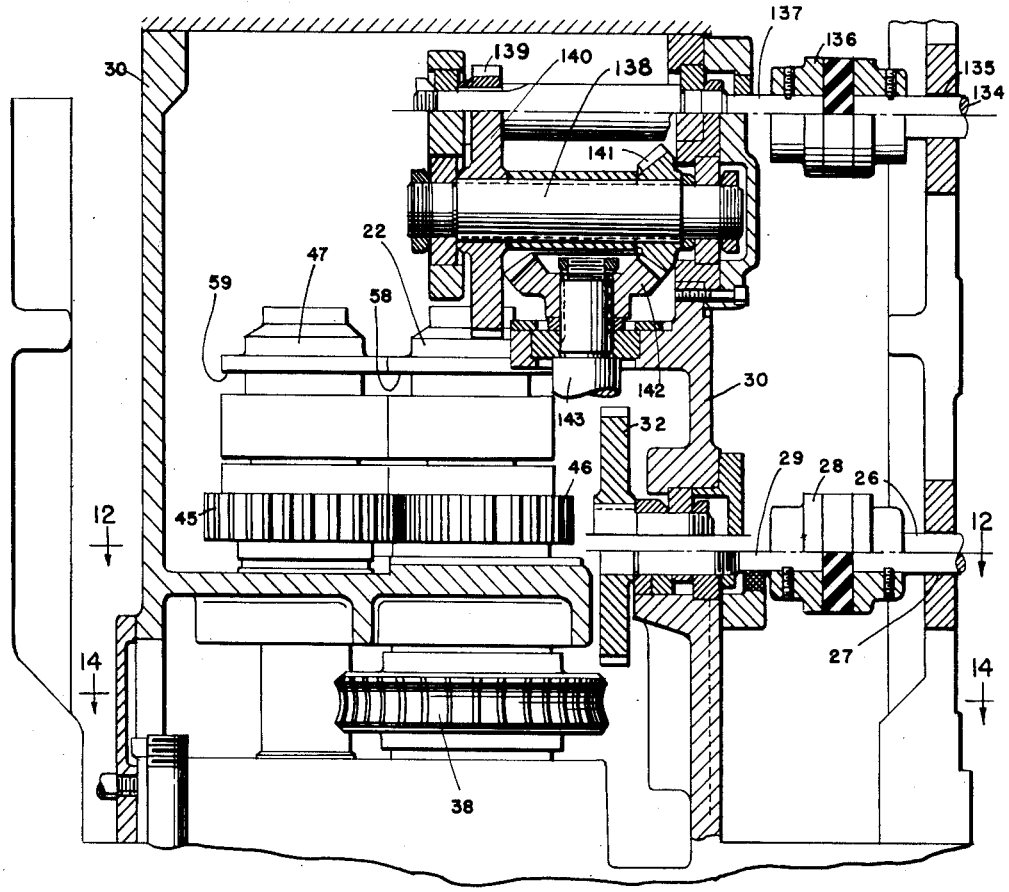
FIG 9
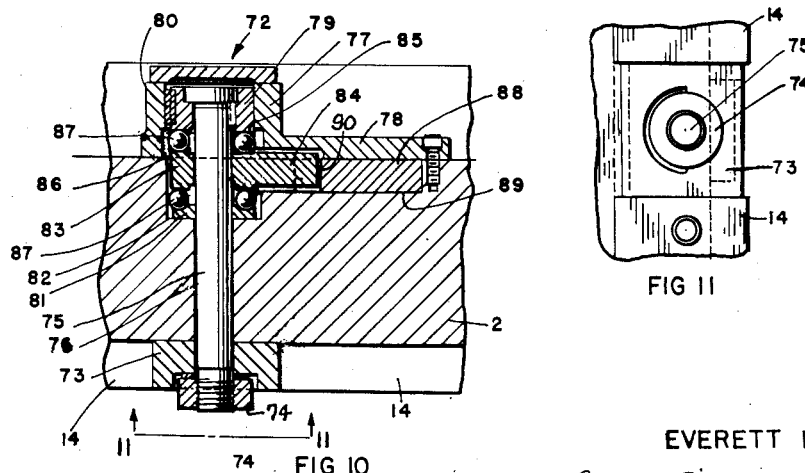
FIG 10
FIG 11
INVENTOR:
EVERETT E. HOSEA
BY Carlson, Pitzner, Hubbard & Wolfe
ATT'YS Dec. 2, 1952  E. E. HOSEA  2,619,880
MACHINE TOOL
Filed Sept. 9, 1946  16 Sheets-Sheet 7

INVENTOR:
EVERETT E. HOSEA
BY Carlson, Pitzner, Hubbard & Wolfe
ATT'YS

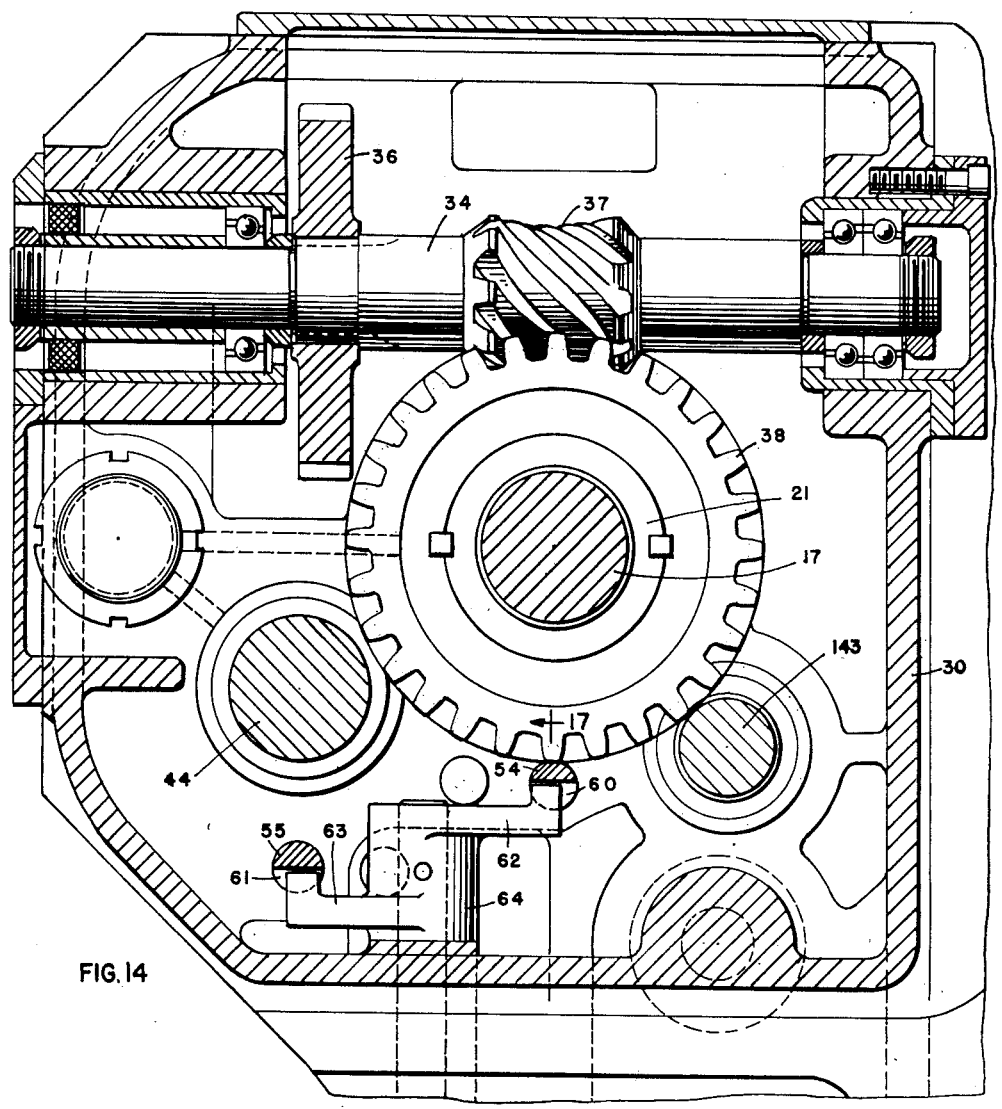
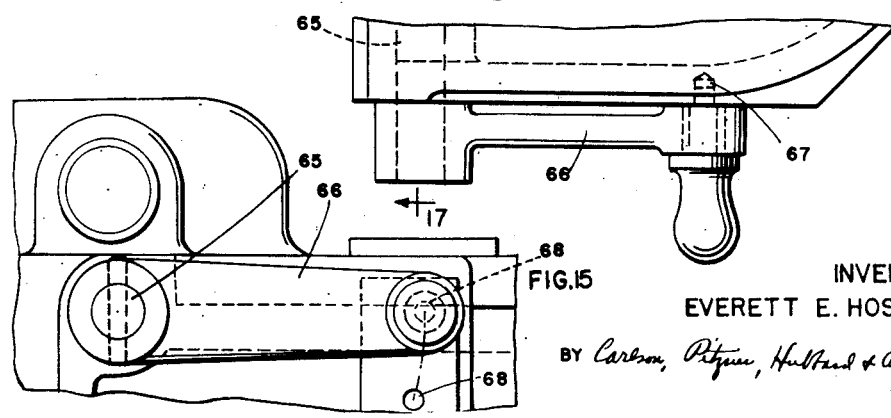

Dec. 2, 1952  E. E. HOSEA  2,619,880
MACHINE TOOL

Filed Sept. 9, 1946  16 Sheets-Sheet 9

INVENTOR:
EVERETT E. HOSEA
BY Carlson, Pitzner, Hubbard & Wolfe
ATT'YS

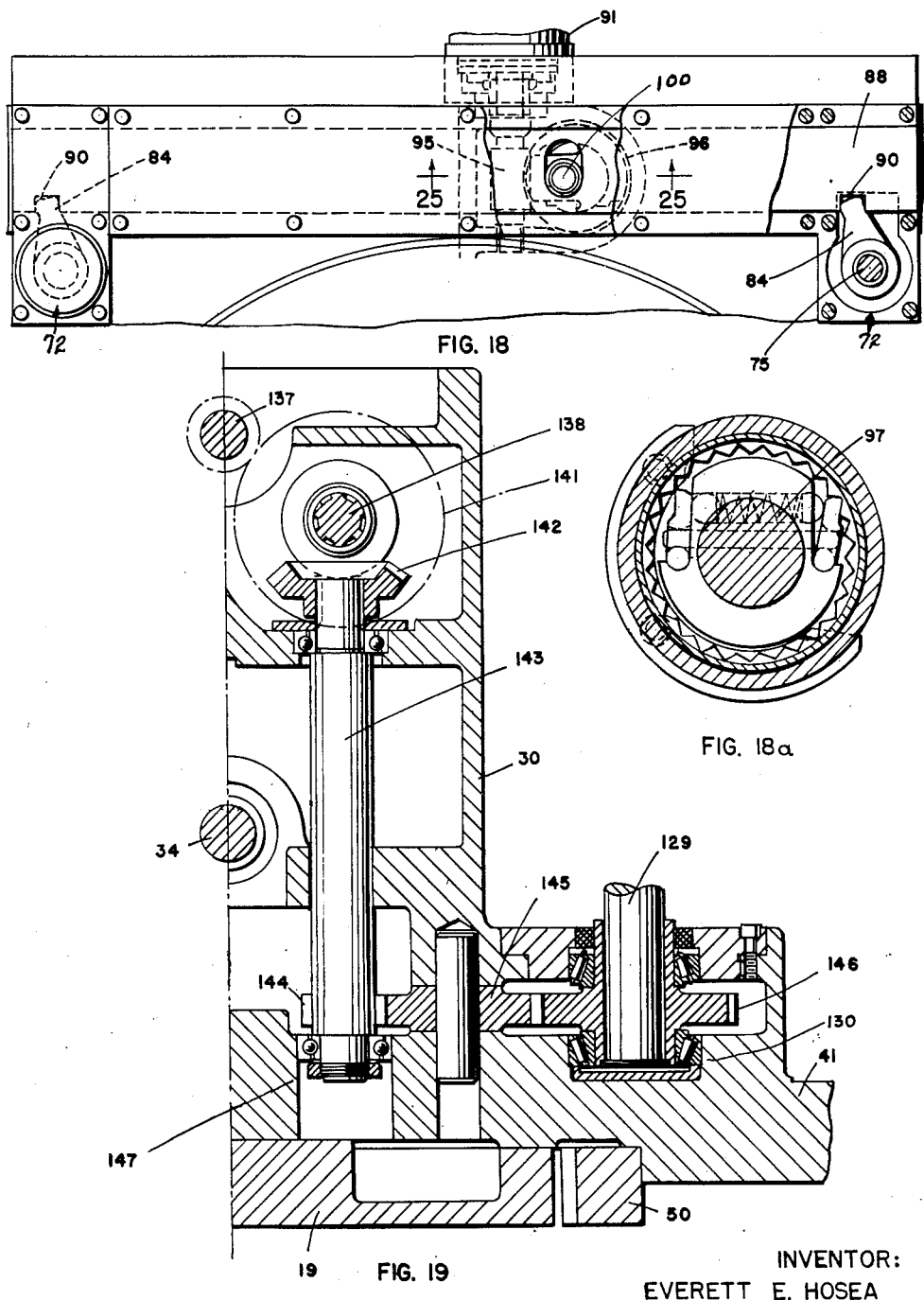

INVENTOR:
EVERETT E. HOSEA

Dec. 2, 1952 E. E. HOSEA 2,619,880
MACHINE TOOL
Filed Sept. 9, 1946 16 Sheets-Sheet 12

INVENTOR:
EVERETT E. HOSEA
BY Carlson, Pitney, Hubbard & Wolfe
ATT'YS

Dec. 2, 1952   E. E. HOSEA   2,619,880
MACHINE TOOL
Filed Sept. 9, 1946   16 Sheets-Sheet 13
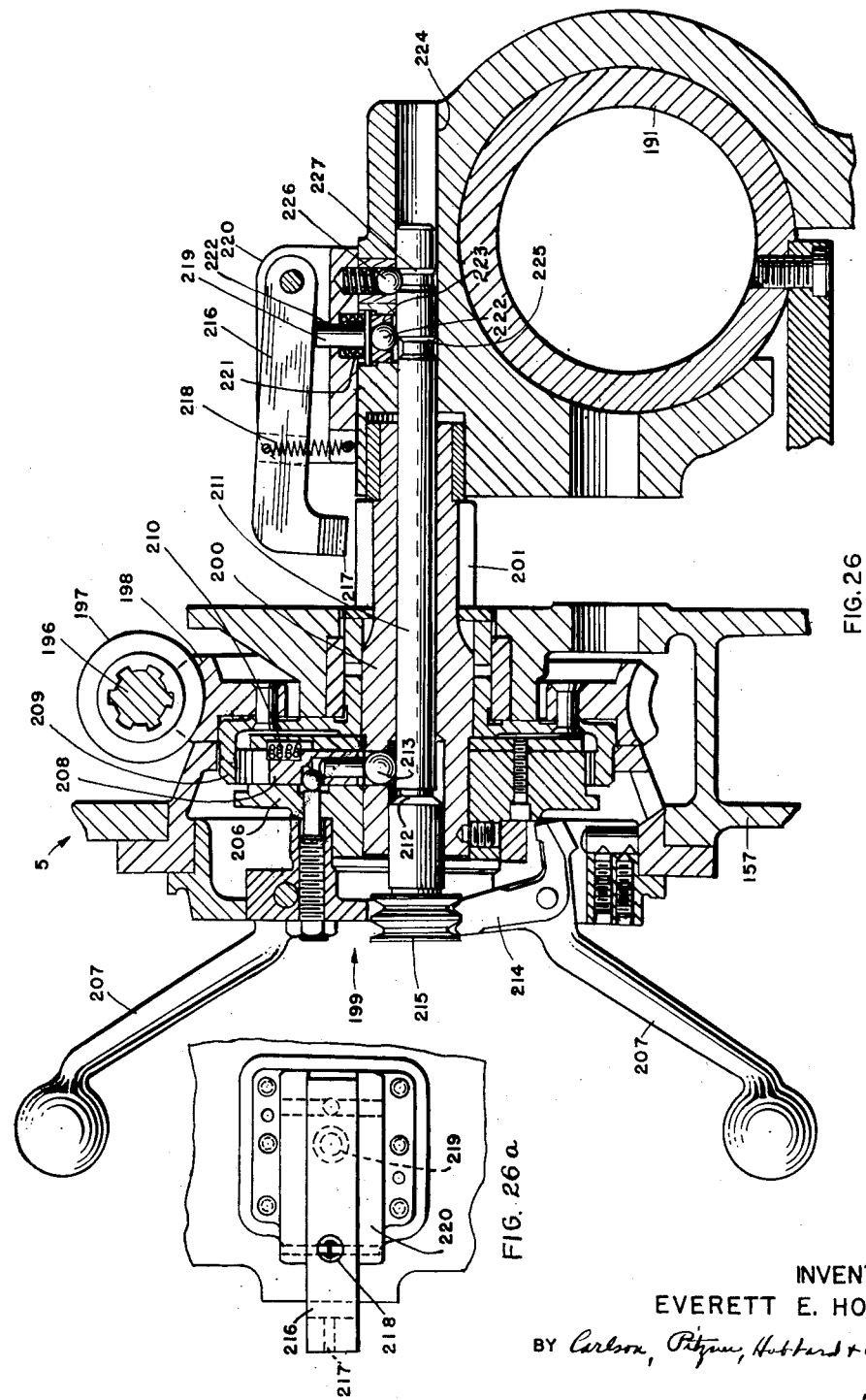
INVENTOR:
EVERETT E. HOSEA
BY Carlson, Pitzner, Hubbard & Wolfe
ATT'YS

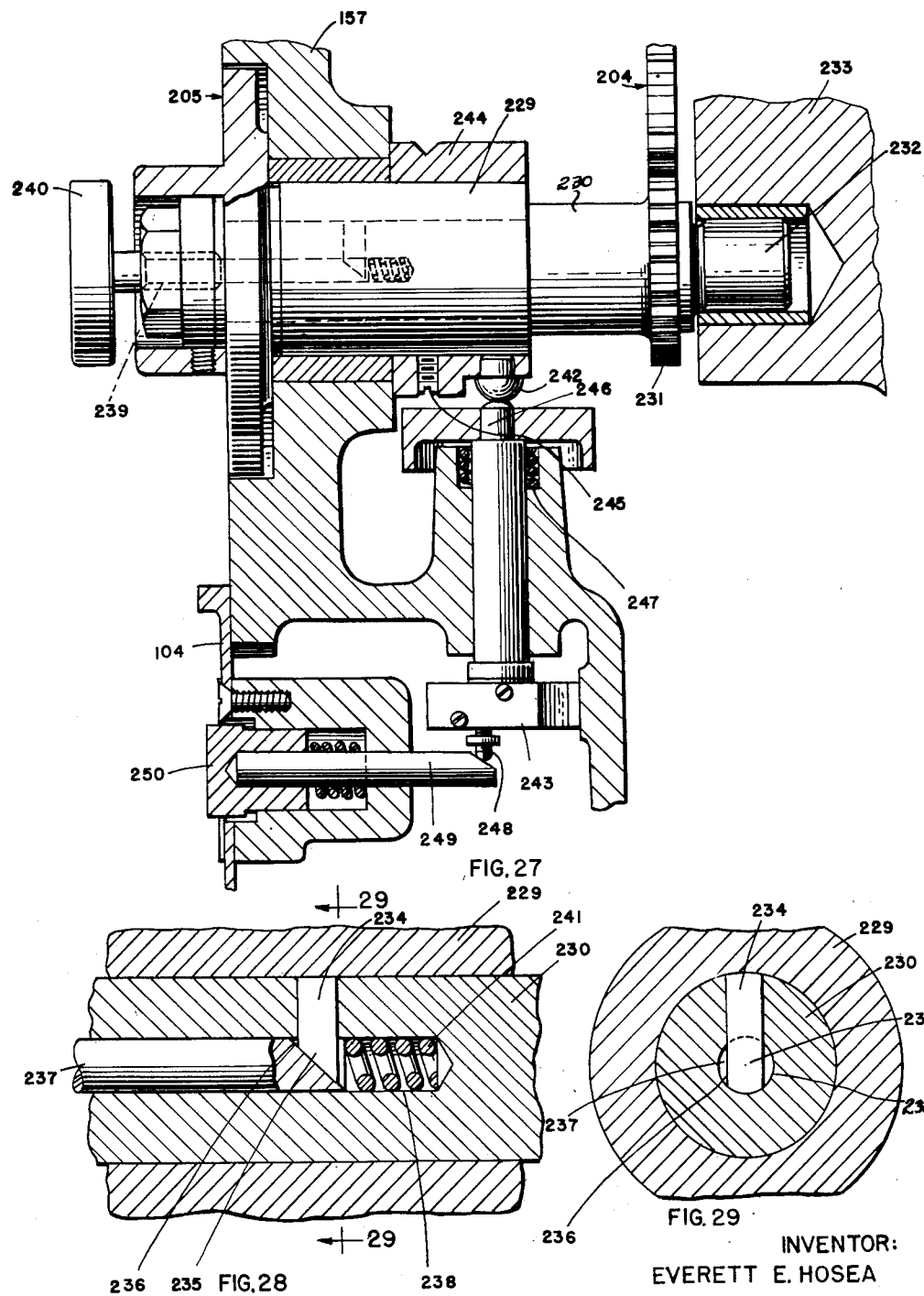

Dec. 2, 1952     E. E. HOSEA     2,619,880
MACHINE TOOL

Filed Sept. 9, 1946     16 Sheets-Sheet 15

INVENTOR:
EVERETT E. HOSEA

Dec. 2, 1952     E. E. HOSEA     2,619,880
MACHINE TOOL

Filed Sept. 9, 1946     16 Sheets-Sheet 16

INVENTOR:
EVERETT E. HOSEA

ATT'YS

Patented Dec. 2, 1952

2,619,880

UNITED STATES PATENT OFFICE 2,619,880

MACHINE TOOL

Everett E. Hosea, Kaukauna, Wis., assignor to Giddings & Lewis Machine Tool Co., Fond du Lac, Wis., a corporation of Wisconsin Application September 9, 1946, Serial No. 695,677

19 Claims. (Cl. 90—17)

The present invention relates to improvements in machine tools adapted for such metal removing operations, such as boring, drilling, milling, tapping and facing, and has particular reference to a universal machine of this type which is portable as an intact operable unit from place to place for machining large and heavy work pieces.

One of the objects of the invention is to provide a novel machine tool of the foregoing type in which a spindle headstock is vertically translatable on a column mounted on a base slide for horizontal translation therewith and for swivel adjustment thereon through 360°, and in which a power operated drive transmission is adapted to be selectively connected either to translate the base slide or swivel the column.

Another object is to provide such a machine in which the headstock is mounted for swivel adjustment about a horizontal axis on a head slide guided on the column to locate the spindle selectively in a horizontal position or with the forward end of the spindle inclined either upwardly or downwardly, the headstock including a lubricating system adapted to take oil from the lowermost portion of the headstock housing regardless of the direction of inclination.

A further object is to provide new and improved means for interconnecting related electrical units on the column and the base slide in any swivel position of the column.

Further objects and advantages will become apparent as the description proceeds.

In the accompanying drawings:

Fig. 2 is a side elevational view of the machine;

Fig. 3 is a plan view;

Fig. 5 is a fragmentary horizontal sectional view through the column and showing the mounting of the headstock;

Fig. 5a is a fragmentary detail view;

Fig. 6 is a fragmentary vertical sectional view showing the mounting of the column;

Fig. 7 is a fragmentary sectional detailed view of a modified form of one of the clamps for securing the headstock in different swivel positions;

Fig. 9 is a fragmentary vertical sectional view through the lower portion of the column, and showing the drive connections from the motors for rotating and translating the column;

Fig. 10 is a fragmentary vertical sectional view through one of the power-actuated clamping devices for the column base slide;

Fig. 11 is a fragmentary bottom view of the clamping device shown in Fig. 10, and taken in the direction of the arrows 11—11 of Fig. 10;

Fig. 14 is a fragmentary horizontal sectional view taken substantially along line 14—14 of Fig. 9;

Fig. 15 is a fragmentary front elevational view of the clutch actuator for the column drives;

Fig. 18 is a fragmentary plan view of the base slide illustrating the clamping mechanism;

Fig. 18a is a fragmentary sectional view taken substantially along line 18a—18a of Fig. 25;

Fig. 19 is a fragmentary vertical sectional view through the column illustrating the drive for the head elevating screw;

Fig. 26 is an enlarged axial sectional view of the master clutch incorporated in the spindle headstock;

Fig. 26a is a fragmentary plan view of a lock for the spindle feed transmission;

Fig. 27 is a fragmentary vertical sectional view through the automatic tapping device in the headstock;

Fig. 28 is a fragmentary axial sectional view showing the setting clamp for the tapping dial;

Fig. 29 is a fragmentary transverse sectional view taken along line 29—29 of Fig. 28;

Figure 1:
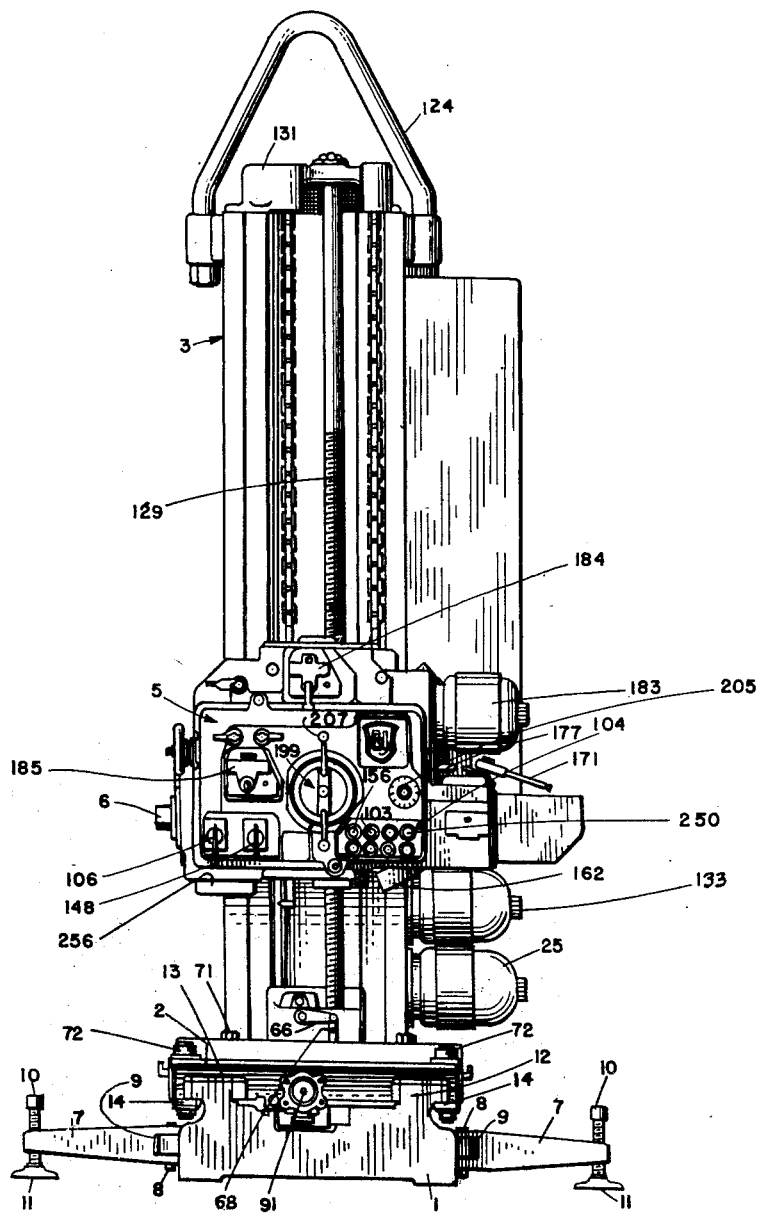
Fig. 1 is a front elevational view of a machine embodying the features of the invention.

Referring more particularly to the drawings, the universal machine constituting the exemplary embodiment of the present invention comprises in general an elongated horizontal base frame or runway 1 adapted to be mounted on and rigidly secured to a suitable foundation, a base slide 2 mounted on the base frame for horizontal translation, a vertical column 3 mounted on the slide for translation therewith and for rotary adjustment about a vertical axis through 360°, a saddle or head slide 4 (Fig. 2) mounted on the column for vertical translation, and a spindle headstock 5 mounted on the slide for translation therewith and for a swivel adjustment in a vertical plane through approximately 45° both above and below the horizontal. The headstock 5 includes a tool spindle 6 which is supported therein for rotation in forward and reverse directions selectively at eighteen different speed rates, and for axial translation in forward and reverse directions selectively at eighteen different feed rates, and which is adapted to be located through swivel adjustment of the headstock 5 selectively in a horizontal position or in any desired angular position through a range of 90°, with the operative end disposed either above or below the swivel axis. By reason of the swivel adjustment of the column 3, the spindle 6 can also be located in any desired angular position about the vertival swivel axis. All of the units 2, 3 and 4 are adapted to be traversed or swivelled by power actuating means, and the headstock 5 is adapted to be swivelled manually. All of the units 2, 3, 4 and 5 are adapted to be rigidly clamped to their respective supports in their selected positions of adjustment, the clamps for the swivels being manually operable, and the clamps for the translatable units being power operable.

The base frame or runway 1 is hollow and rectangular in construction, and is internally webbed and chambered to enclose various portions of the power transmissions for selectively translating the base slide 2 or swivelling the column 3. Preferably, outboard supports are provided along opposite sides of the base frame 1 to improve the stability of the machine, particularly when the latter is not rigidly secured to the foundation. In the present instance, the outboard supports comprise two pairs of oppositely disposed spreader arms 7 (Figs. 1 and 3) which are pivotally secured at their innermost ends by means of vertical pins 8 to interfitting lugs 9 rigidly attached to the opposite sides of the base frame 1. Vertical adjusting screws 10 are threaded through the outermost ends of the spreader arms 7 and are provided at their lower ends with flat circular pads 11 adapted to rest on the supporting foundation. It will be evident that the spreader arm 7 can be swung out of the way along the sides of the base 1 when their use is not required, as, for example, when moving the machine from place to place.

Figure 20:
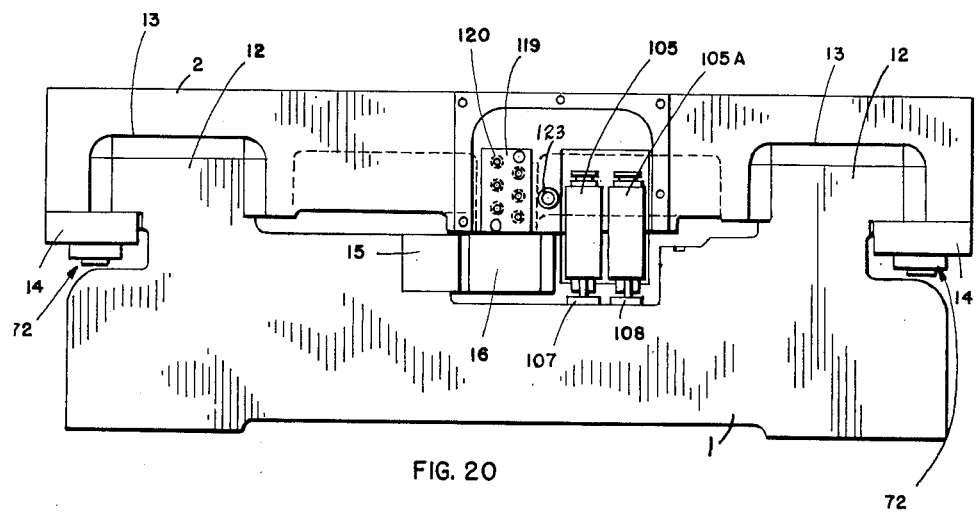
Fig. 20 is an end view on an enlarged scale of the base frame and slide.
Figure 21:
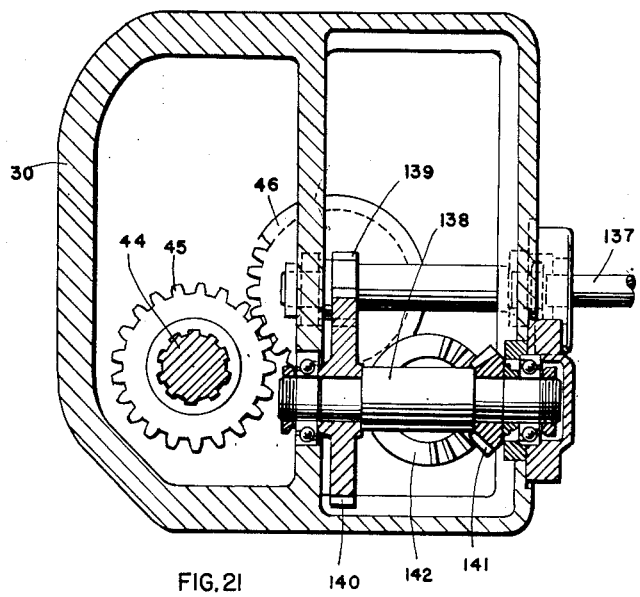
Fig. 21 is a transverse sectional view through the column, and illustrating a part of the drive for the head elevating screw.

The top of the base frame 1 is formed along opposite sides with two spaced parallel longitudinal guide rails 12 (Figs. 6 and 20) of flat rectangular form. The column slide 2 is formed in the underside and along its opposite side margins with spaced parallel guideways 13 complemental in transverse shape to the guide rails 12 and slidably engaging the latter. Suitable gib plates 14 are secured to the underside of the saddle 2 and engage underneath outwardly projecting portions of the guide rails 12 so as to confine the slide on the base frame 1.

Figure 8:
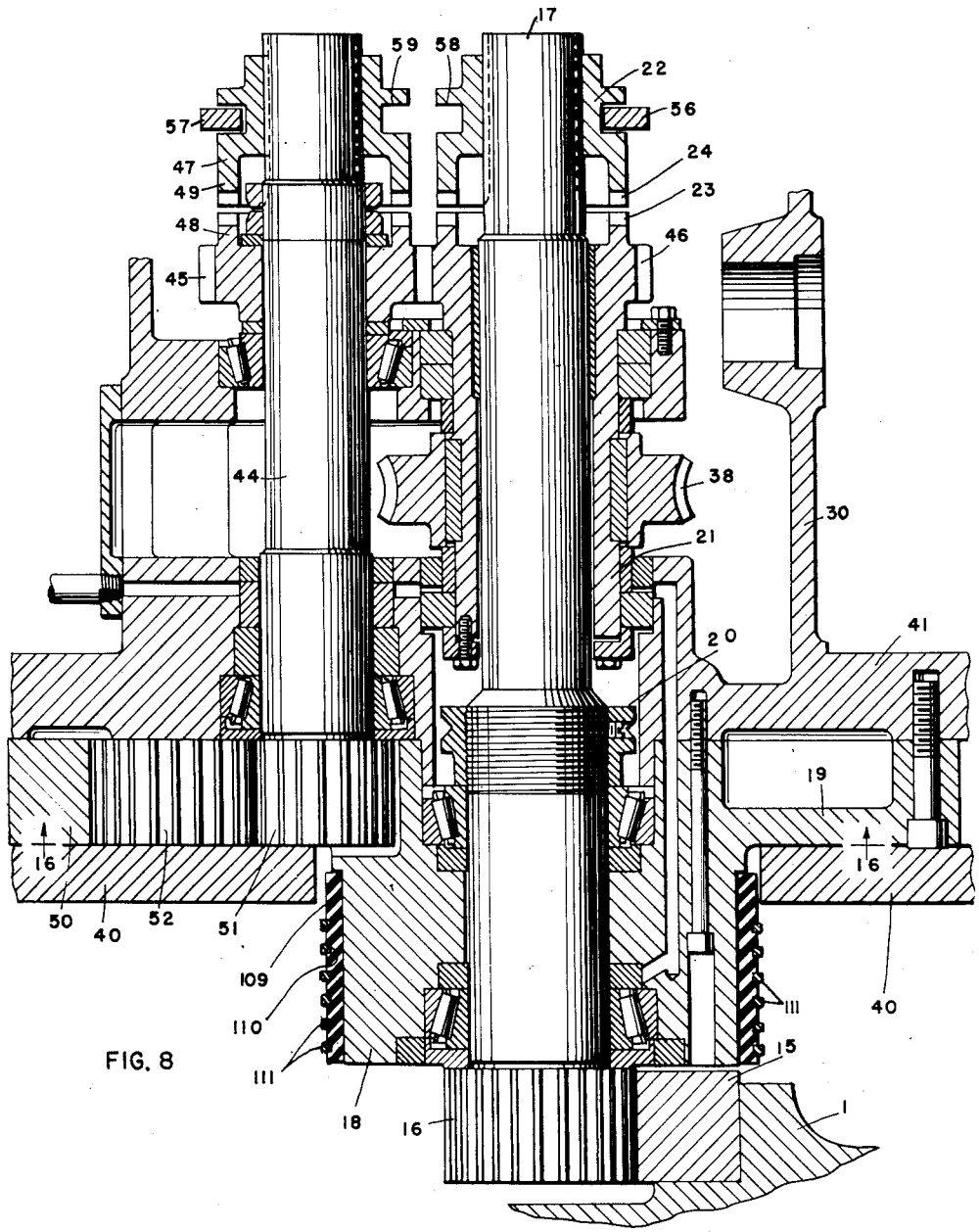
Fig. 8 is a fragmentary vertical sectional view of the selective gear drives for rotating and translating the headstock column.

Any suitable means may be provided for traversing or adjusting the slide 2 along the base frame 1. In the present instance, a rectilinear gear rack 15 (Figs. 6 and 8) is rigidly secured to the base frame 1 in position slightly below and intermediate the guideways 13, and extends longitudinally in parallel relation thereto. The gear rack 15 is engaged by a drive pinion 16, which is fixed on the lower end of a vertical stub shaft 17 located on the vertical swivel axis of the column 3. The shaft 17 extends upwardly through and is suitably journalled in a coaxial depending cylindrical bearing 18 (Fig. 8) having an external peripheral mounting flange 19 doweled and bolted to the underside of the column 3. A nut 20 threaded and locked on the shaft 17 above the bearing 18 coacts with the gear 16 to support the shaft 17 vertically and to constrain it against endwise movement. Above the nut 20, the shaft 17 is reduced in size and extends for free rotation through an elongated drive sleeve 21 suitably journalled in a fixed axial position within the lower end portion of column 3. A clucth sleeve 22 is slidably splined for relative axial movement on the extreme upper end of the shaft 17. The sleeves 21 and 22 are formed on their adjacent ends with suitable clutch elements 23 and 24 adapted for engagement to connect the shaft 17 for power drive when it is desired to translate or adjust the slide 2 along the guide rails 12 on base frame 1.

The drive sleeve 21 may be connected to a suitable source of power, such, for example, as a reversible variable-speed electric motor 25. In the present instance, the motor 25 is mounted exteriorly on one side and adjacent the lower end of the column 3 and has a drive shaft 26 (Fig. 9) connected through a speed reduction gear transmission within the column to the drive sleeve 21.

It will be understood that through suitable control of the motor 25, the slide 2, with all of the machine structure superimposed thereon, may be translated selectively in either direction and at various rates of speed along the base frame 1. A finely graduated feed range may be obtained by utilizing an electronic speed control for the motor 25. Such electronic control per se does not form any part of the present invention, and hence is not disclosed herein, but may be of the type disclosed in a copending application by Keith F. Gallimore, Serial No. 582,910, filed March 15, 1945 (Patent No. 2,428,308, issued September 30, 1947).

Figures 12, 13:
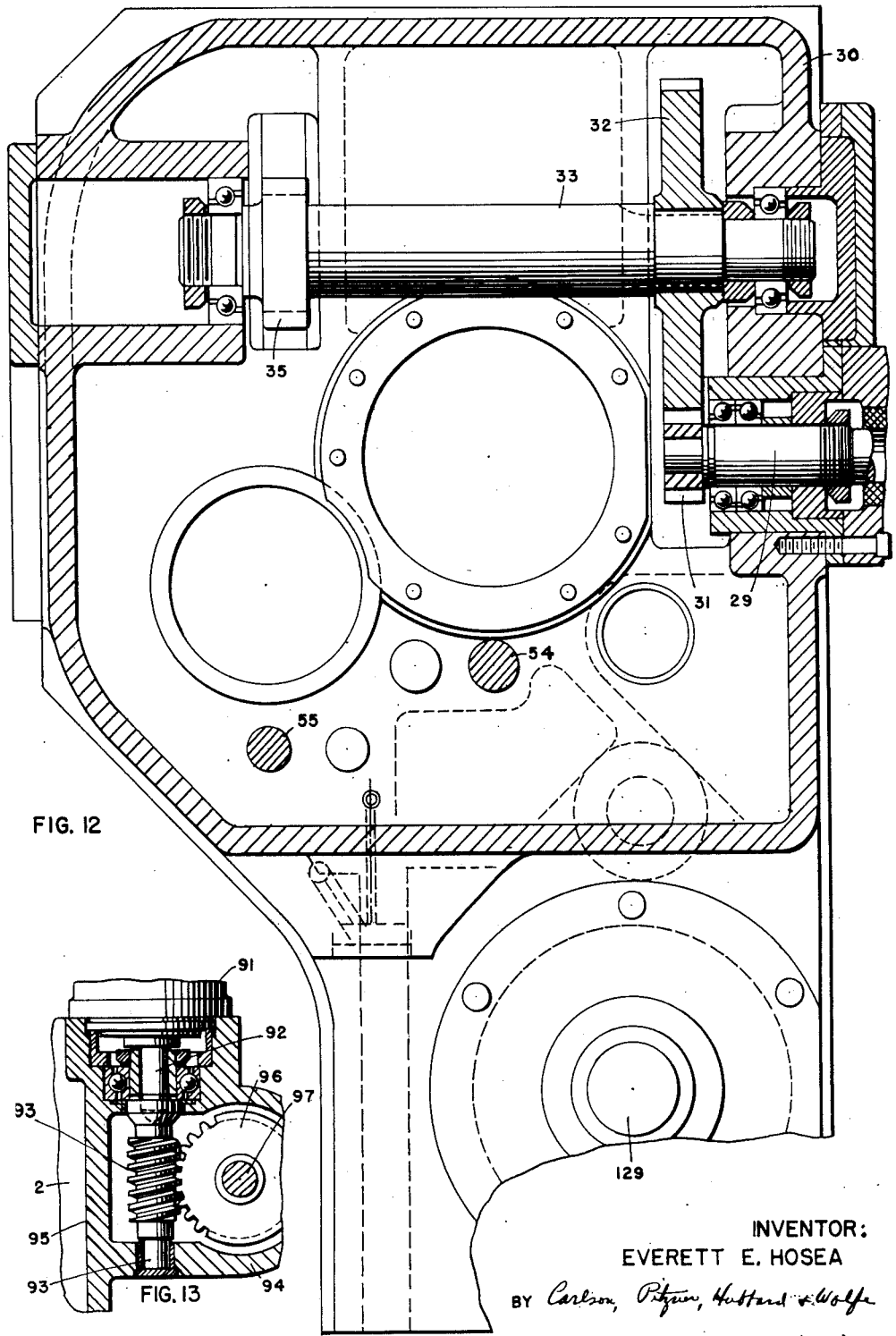
Fig. 12 is a horizontal sectional view taken substantially along line 12—12 of Fig. 9.
Fig. 13 is a fragmentary horizontal sectional view of the power actuator for the clamping devices for the base slide.
Figure 16:
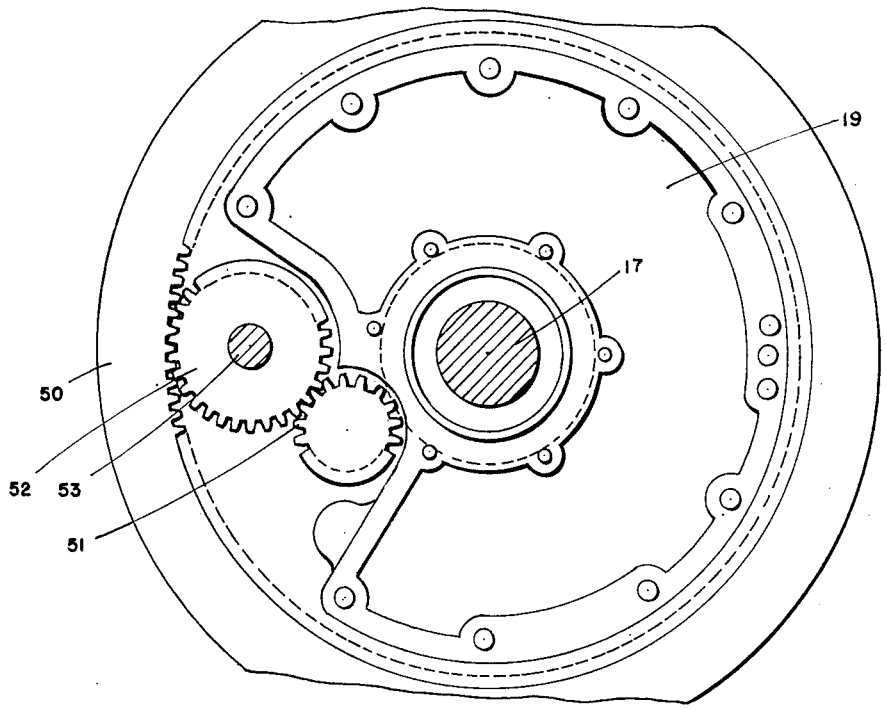
Fig. 16 is a fragmentary horizontal sectional view looking upwardly in the plane of line 16—16 in Fig. 8.

Tracing the gear transmission (Figs. 4a, 8, 9, 12, 14) from the motor 25 to the drive sleeve 21, the motor shaft 26 extends through an opening 27 (Fig. 9) in one side wall of the column 3, and is connected through a flexible coupling 28 to an intermediate shaft 29 in axial alignment therewith and in turn rotatably supported in one wall of a milling feed housing 30 within the column. A pinion 31 (Fig. 12) on the inner end of the intermediate shaft 29 meshes with a relatively large gear 32 on a parallel shaft 33 to provide a first speed reduction. The parallel or offset shaft 33 is suitably journalled at opposite ends within the column 3, and is connected to a worm shaft 34 through gears 35 (Fig. 12) and 36 (Fig. 14) providing a second speed reduction. The shaft 34 also is suitably journalled within the column 3, and is located below and in parallel relation to the shaft 33. An hourglass worm 37 on the shaft 34 meshes with a worm wheel 38 (Figs. 8, 14) coaxially secured to the drive sleeve 21 at a point intermediate the nut 20 and the clutch element 23 to provide a third speed reduction between the motor 25 and the sleeve. It will be understood that by location of the shaft 17 and the drive sleeve 21 on the vertical swivel axis on the column 3, the drive will be maintained in all angular positions of column adjustment.

To provide means for adjustably supporting the column 3 on the base slide 2, the latter is formed on the top surface with a flat annular guideway 39 (Fig. 6) circumscribing a central depressed annular flange or shelf 40 underlying the mounting flange 19 of the bearing 18. The column 3 is supported at the lower end on a circular base plate or platen 41 rigid with the housing 30 and in flat bearing engagement with the machined way 39 of the slide 2. A flanged guide ring 42 engages in a peripheral groove 43 in the upper edge of the platen 41 and is rigidly bolted to the base slide 2 to locate and confine the column 3 for rotary adjustment on the supporting slide.

The platen 41 and the superimposed column 3 are adapted for rotary adjustment through a range of 360° by the use of suitable power means. In the preferred form, this means comprises a branch drive adapted to be taken off the drive sleeve 21. More particularly, the drive comprises a vertical shaft 44 (Figs. 4b, 8) rotatably journalled in fixed axial position within the column 3, and extending in parallel spaced relation along the shaft 17. A combined drive sleeve and gear 45 is normally freely rotatable on the upper end of the shaft 44, and meshes with a gear 46 rigid with the drive sleeve 21. A clutch sleeve 47 is slidably splined for axial movement on the upper end of the shaft 44 in closely adjacent side-to-side relation with the clutch sleeve 22. The adjacent faces of the gear 45 and clutch sleeve 47 are formed respectively with clutch elements 48 and 49, adapted for separable engagement to connect the gear to the shaft 44. A ring gear 50, constituting a circular rack extending through 350°, is seated on and secured to the flange 40 concentrically about the swivel axis of the column 3, and the lower end of the shaft 44 is operatively connected thereto through a train of speed reduction gears. Thus, a pinion 51 fixed on the lower end of the shaft 44 meshes with an idler gear 52, in turn meshing with the ring gear 50. The idler gear 52 is rotatably disposed on the lower end of a stub bearing 53 projecting from the bottom face of the platen 41, and is axially confined between the flange 40 and the platen.

Figure 17:
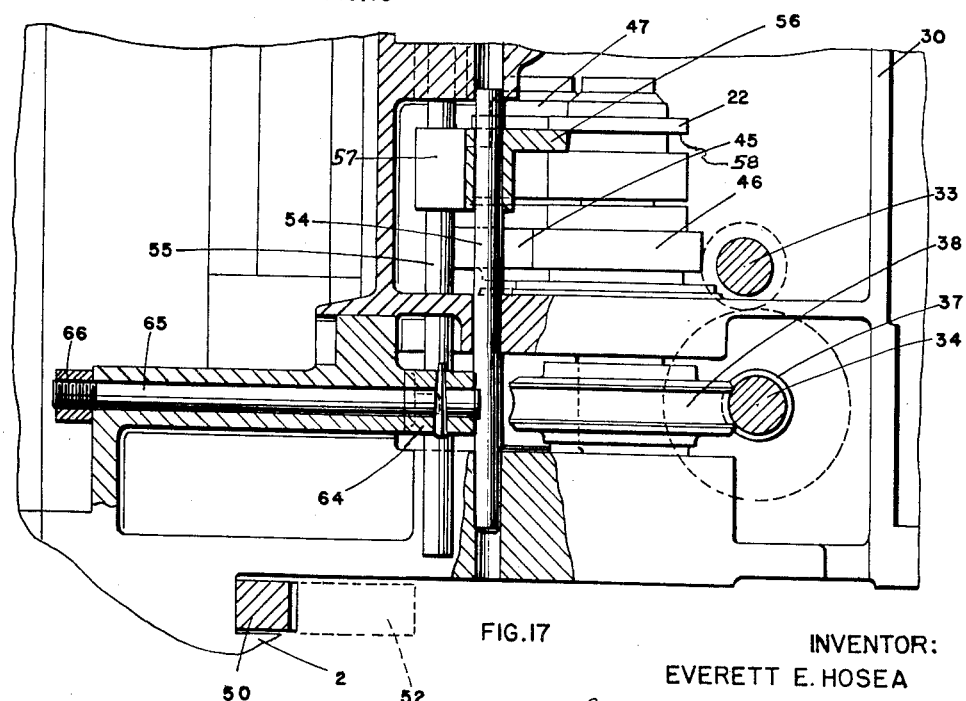
Fig. 17 is a fragmentary vertical sectional view taken substantially along the line 17—17 of Fig. 14.

A suitable interlocking clutch actuating mechanism is provided for shifting the clutch sleeves 22 and 47 selectively to connect either the drive for translating the base slide 2 or the drive for rotatably adjusting the column 3. In the present instance, the clutch actuating mechanism comprises a pair of parallel vertical shifter rods 54 and 55 (Figs. 14, 17) slidably guided within the column 3. The upper ends of the rods 54 and 55 are provided with shifter shoes 56 and 57 (Figs. 4b, 8, 17) respectively engaging in peripheral grooves 58 and 59 in the clutch sleeves 22 and 47. The lower ends of the rods 54 and 55 are formed with transverse notches 60 and 61 respectively receiving the rounded outer ends of oppositely extending levers 62 and 63 on an actuating sleeve 64 (Fig. 14). This sleeve is pinned to the inner end of a rockshaft 65 journalled and extending through one side wall of the column 3 for external actuation. A selector lever 66 is pinned to the outer end of the rockshaft 65, and is provided with a releasable spring-actuated detent 67 adapted for engagement in either of two locating apertures 68 (Fig. 15) to lock the rockshaft 65 selectively in either position of adjustment. It will be evident that upon movement of the lever 66 in one direction, the arms 62 and 63 will act simultaneously, through the shifter rods 54 and 55 and shoes 56 and 57, to engage the clutch elements 23 and 24 and disengage the clutch elements 48 and 49 so as to establish the drive for translating the base slide 2. Conversely, upon moving the lever 66 in the opposite direction, the sleeves 22 and 47 will be shifted simultaneously to disengage the clutch elements 23 and 24 and engage the clutch elements 48 and 49 so as to establish the drive for adjusting or rotating the column 3. Since the two clutch sleeves 22 and 47 are simultaneously and oppositely shiftable by means of a single actuator, they are mechanically interlocked so that when either of the two drives is connected, the other drive is necessarily disengaged.

Suitable clamping means is provided for securing the base slide 2 and the column 3 in selected positions of adjustment. In the case of the column 3, the clamping means is manually operable, and comprises a plurality of T-bolts 69 (Fig. 6) which extend through the peripherally projecting portion of the circular platen 41, and which have their heads slidably confined in a circular T-slot 70 formed in and opening to the top of the base slide 2 concentrically about the ring gear 50. Nuts 71 are provided for tightening the bolts 69 to clamp the platen 41 rigidly to the slide 2. By rotary adjustment of the column 3, the spindle 6 of the headstock 5 may be disposed to any angular position through a range of 360° in a horizontal plane.

The clamping means for securing the base slide 2 in any selected position of adjustment or translation on the base frame 1 comprises a plurality of clamping devices 72 arranged for operative engagement with the guide rails 12, and adapted for simultaneous operation in common by a reversible power actuator. In the present instance, one such clamping device 72 is mounted in each side of the base slide 2 for engagement with the underlying guide rail 12. The clamping devices 72 per se may be of any desired construction, and in the present instance are generally similar to the type of clamping mechanism disclosed in the patent to Keith F. Gallimore, No. 2,251,016, issued July 29, 1941. In the specific form disclosed, each clamping device 72 comprises a rectangular clamping block or shoe 73 (Figs. 6, 10) which is disposed with a close sliding fit in the space between interrupted sections of the associate gib plate 14. The shoe 73 is adjustably secured by means of a nut 74 to the lower end of a vertical draw bolt 75 extending slidably through a bore 76 in the outer edge portion of the base slide 2. The upper end of the bolt 75 is headed and extends into a housing 77 on one end of a plate 78 secured to the top of the base slide 2. A non-rotary annular cam member 79 encircles the upper end of the bolt 75 and seats against the bolt head for axial movement therewith. The cam member 79 is slidable within the housing 77 and constrained against rotation by a spline key 80. An annular ball raceway 81 is positioned about the bolt 75 within a counterbore 82 at the end of the bore 76. Interposed between the cam member 79 and the ball raceway 81, and encircling the bolt 75 is a rotary cam member 83 having a radially projecting rocker arm 84. The adjacent oppositely-disposed annular faces of the non-rotatable and rotatable cam members 79 and 83 are formed with a series of coacting inclined wedge or cam elements 85 and 86. Suitable balls 87 are interposed in one instance between the rotary cam member 83 and the raceway 81 to provide an end thrust anti-friction bearing relationship, and in the other instance between the cam elements 85 and 86 to complete the wedge bearing relationship. It will be evident that upon rotary actuation of the cam member 83 into tight wedge engagement with the member 79, the bolt 75 will be drawn upwardly to clamp the guide rail 12 securely between the upper surface of the guideway 13 and the clamping shoe 73.

The rocker arms 84 of the two clamping devices 72 are mechanically interconnected for joint actuation. In the present instance, the means for this purpose comprises an elongated rectangular bar 88 (Fig. 18) extending transversely across the base slide 2, and slidably supported at opposite ends in transverse guideways 89 (Fig. 10) recessed in the top walls of the guideways 13 and closed by the overlying plates 78. Each end of the actuating bar 88 is formed in one side edge with a notch 90 (Fig. 18) operatively receiving the rounded outer end of the associated rocker arm 84. Consequently, longitudinal reciprocation of the bar 88 in opposite directions will effect respectively application or release of the clamping devices 72.

Figures 24, 25:
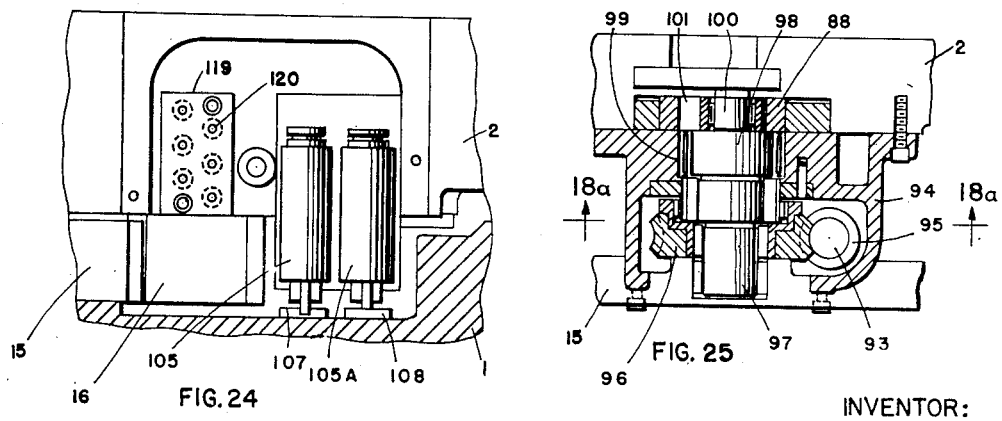
Fig. 24 is a fragmentary sectional view taken along line 24—24 of Fig. 22.
Fig. 25 is a vertical sectional view taken along line 25—25 of Fig. 18, and showing the actuator for the clamping devices for the base slide.

The actuator for the bar 88 comprises a reversible electric torque motor 91 (Figs. 13, 18) supported from the underside of the base slide 2 between the guideways 13. The motor 91 has a drive shaft 92 (Fig. 13) which extends longitudinally of the base frame 1 and hence transversely of the bar 88, and which is suitably coupled to an axially aligned worm shaft 93 journalled in a gear housing 94 on the underside of the base slide 2. A worm 95, fixed on the shaft 93, meshes with a worm wheel 96 fixed on a vertical crankshaft 97. A crank disc 98 (Fig. 25) is integral with the upper end of the shaft 97, and is rotatably supported in a peripheral bearing 99 immediately beneath the clamp actuating bar 88. The disc 98 is provided with an eccentric crankpin 100 which projects upwardly into a transverse slot 101 in the clamp actuating bar 88, and is provided with an antifriction bearing ring 102 slidably engaging the sides of the slot. The motor 91 has suitable electrical control circuits comprising an "on" and "off" switch 103 (Fig. 1) included in an electrical control panel 104 on the front of the headstock 5. In operation, assuming that the switch 103 has been actuated to effect release of the clamping devices 72, the crankpin 100 will locate the bar 88 in one extreme end position. Upon actuation of the switch 103 to institute reverse operation of the motor 91, the crankpin 100 will be revolved through somewhat less than 180° to shift the clamp actuating bar 88 out of said position until the clamping devices 72 are applied.

Provision is made for supplying electrical energy to the various electrical units located within the base frame 1, and for interconnecting these units and related electrical units on the column 3 and headstock 5. In the present instance, the electrical units within the base frame 1 comprise the column base clamp motor 91, and two limit switches 105 and 105a (Figs. 2b, 24) connected in the controls for the column feed motor 25. The control circuits for the column feed motor 25 also include a selector switch 106 (Fig. 1) on the front of the headstock 5 for determining the direction and the rate of feed. The limit switches 105 and 105a are supported on the base slide 2 for movement therewith, and are located for actuation respectively by suitable cams 107 and 108 adjustably mounted in the base frame or runway 1.

Figure 22:
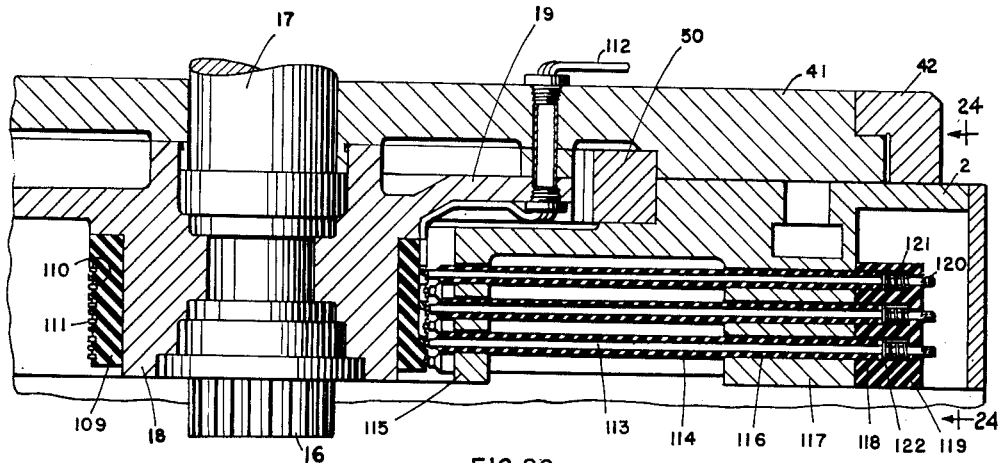
Fig. 22 is a fragmentary vertical sectional view taken on the longitudinal medial plane of the base slide.
Figure 23:
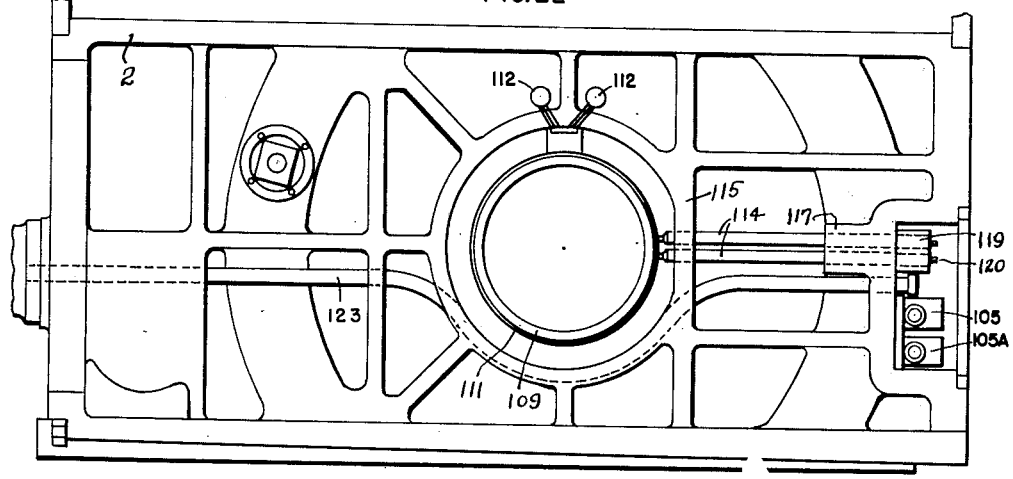
Fig. 23 is a bottom view of the base slide.

In order to provide the necessary electrical connections from the rotatably adjustable column 3 to the base slide 2, the depending cylindrical bearing 18 is utilized as a collector ring drum. To this end, an electrical insulating sleeve 109 (Figs. 8, 22) encircles and is secured to the bearing 18, and is formed in the outer periphery with a series of axially-spaced annular grooves 110 in which a corresponding member of electrical collector rings 111 are inserted. In the present instance, six collector rings 111 are shown, and they are arranged concentrically about the swivel axis of the bearing 18 and are connected to electrical leads 112 (Figs. 22, 23) extending upwardly through the circular platen 41 to the electrical units and control elements on the column 3 and headstock 5.

A plurality of electrical brushes 113 are suitably mounted in one end of the base slide 2 for sliding contact respectively with the collector rings 111 in any position of rotary adjustment of the column 3. In the present instance, six brushes 113 are provided, and they are preferably alike in construction and arranged in vertically staggered relation. Each brush comprises an elongated rod of electrical conducting material extending slidably through and guided by a tube or sleeve 114 of electrical insulating material. The rods 113 and sleeves 114 extend longitudinally of the guide rails 12 toward one end of the base slide 2 where the outer ends are readily accessible for assembling and servicing the electrical circuits. The innermost ends of the sleeves 114 extend through and are rigidly supported in a depending rib 115 on the underside of the slide 2, and the outermost ends thereof extend freely through suitable bores 116 in a depending end bracket 117 on the slide, and thence with a tight fit partially into aligned bores 118 in one side of an insulating block 119 secured to the bracket. The outermost ends of the rods 113 extend from the sleeves 114 through the bores 118 and completely through the block 119 to provide external terminal posts 120 for the attachment of electrical leads. In each instance, a coiled compression spring 121 is seated in the bore 118 and engages a collar 122 on the rod 113 to maintain the innermost end thereof in wiping electrical contact with the associated collector ring 111. The terminal posts 120 are connected in pairs through suitable electrical leads 123 (Fig. 23) respectively to the motor 91 and the limit switches 105 and 105a.

The column 3 is hollow and internally ribbed for maximum rigidity. A lifting bail 124 (Fig. 1) is attached to the top of the column 3 so as to permit the entire machine to be moved as a portable unit from place to place. The bail 124 is so located that the machine when suspended from a lifting cable will hang plumb during such moving operation.

To provide means for supporting and guiding the headstock 5, the column 3 is formed on one side with spaced parallel vertical rectangular guide rails 125 (Fig. 5). The saddle or head slide 4, on which the headstock 5 is supported for swivel adjustment, is formed in the rear face with complemental guideways 126 slidably engaging the guide rails 125. Suitable gib plates 127 are secured to the outer flanges of the guideways 126, and engage back of the outwardly projecting portions of the guide rails 125 to confine the slide 4 on the column 3. The slide 4 and headstock 5 assembly is counterbalanced by a suitable counterweight 128 (Fig. 2) movable vertically within the column 3.

Power operable means is provided for elevating and lowering the headstock 5 at rapid traverse and selected feed rates, and in the present instance this means comprises a vertical screw 129 (Figs. 1, 4c) extending between the guide rails 125, and rotatably anchored at opposite ends in a fixed axial position. More particularly, the lower end of the screw 129 is supported in an end thrust bearing 130 (Fig. 19) on circular platen 41, and the upper end is journalled in a head bracket 131 (Fig. 1) on the top of the column 3. The screw 129 is in threaded engagement with a fixed nut (not shown) on the rear of the head slide 4, and is adapted to be driven from a reversible variable-speed electric motor 133 mounted exteriorly on one side of the column 3 immediately above the column feed motor 25. The motor 133 is connected to the lower end of the elevating screw 129 through a suitable speed-reduction gear transmission within the column 3. Tracing the transmission, the motor 133 has a shaft 134 (Figs. 4c, 9) which extends through an opening 135 in one side wall of the column 3, and which is connected through a flexible coupling 136 to an axially aligned shaft 137. The inner end of the shaft 137 is connected to a parallel shaft 138 through intermeshing gears 139 and 140 providing a first speed reduction. The shaft 138 in turn is connected through intermeshing bevel gears 141 and 142 to the upper end of a vertical shaft 143 (Figs. 9, 19) to provide a second speed reduction. The lower end of the vertical shaft 143 (Fig. 19) is connected to the lower end of the head elevating screw 129 through a gear 144, an idler gear 145 and gear 146 providing a third speed reduction. The various shafts 137, 138 and 143 of the drive transmission are suitably journalled within the column 3, and the lower end of the vertical shaft 143 is supported in an end thrust bearing 147 on the platen 41.

The headstock feed motor 133 may advantageously be provided with an electronic control similar to that employed for the column feed motor 25. Thus, the circuits for the motor 133 include a direction and speed control switch 148 (Fig. 1) on the front of the headstock 5, and limit switches 149 and 150 (Fig. 5a) supported within the column 3 and adapted for actuation by a cam 151 carried by the headstock slide 4.

Suitable clamping means is provided for securing the head slide 4 in selected positions of adjustment on the column 3. Preferably, the clamping means for the slide 4 is similar to that employed for the column slide 2 and hence need not again be described in detail. It is sufficient to state that a plurality of clamping devices 152 (Fig. 5) are mounted in opposite sides of the slide 4 for coaction with the guide rails 125 and for simultaneous operation by a reciprocable bar 153 guided for transverse movement in the slide. The bar 153 is shiftable by a revoluble crankpin 154 driven by a reversible electric torque motor 155 (Fig. 3) also mounted on the rear of the head slide 4. The circuits for the motor 155 include an "on" and "off" control switch 156 (Fig. 1) in the panel 104 at the front of the headstock 5. Both the clamping motors 91 and 155 include circuits provided with a timing relay (not shown) for interrupting the connections after the desired function is accomplished.

The headstock 5 comprises a housing 157 which is mounted on the head slide 4 for swivel adjustment to locate the tool end of the spindle 6 in any angular position within a range between 45° above and below the horizontal. The front face of the head slide 4 and the rear face of the headstock housing 157 are adapted for flat bearing engagement. To locate the headstock 5 on the slide 4 for swivel adjustment about a fixed pivotal axis, the housing 157 is provided with a pilot pin 158 (Fig. 5) engaging in a hole 159 in the face of the slide midway of the guides 125. A plurality of clamp bolts 160 extend through the headstock from front to rear, and are provided with heads 161 slidably disposed in an arcuate T slot 161a formed in the front face of the slide 4 concentrically about the hole 159.

Figure 30:
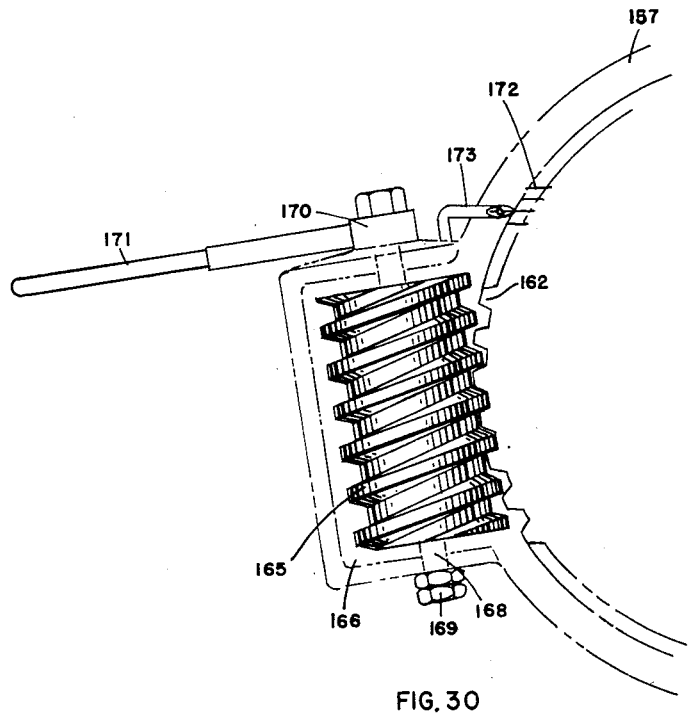
Fig. 30 is a fragmentary view illustrating the means for angularly adjusting the position of the spindle headstock.
Figure 32:
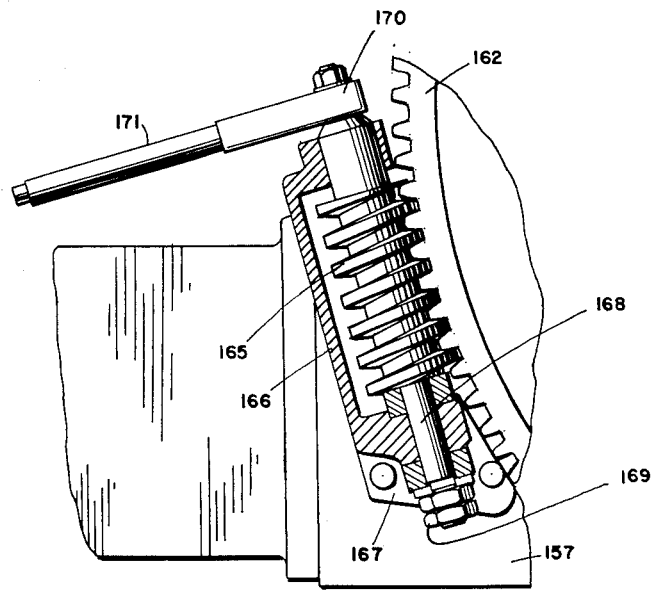
Fig. 32 is a fragmentary rear view of the means for swiveling the headstock.
Figure 33:
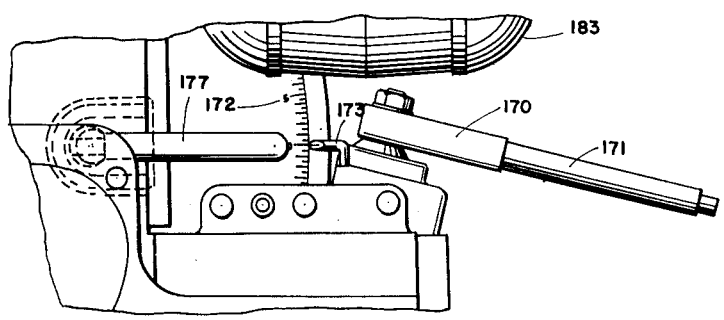
Fig. 33 is a fragmentary front view of the means for swiveling the headstock.

To facilitate swivel adjustment of the headstock 5, an arcuate gear segment 162 (Figs. 5, 30, 32) is secured in a notch 163 in an extension bracket 164 on one side of the head slide 4. The gear segment 162 is arranged concentrically about the center hole 159 and is engaged by a rotary worm 165 supported on the headstock housing 157 for movement therewith. In the present instance, the worm 165 is enclosed in a casing 166 formed on a bracket 167 secured to the rear of the headstock housing 157. The worm 165 has an axial shaft 168 journaled at opposite ends in and projecting through the end walls of the casing 166. One end of the shaft 168 is rotatably anchored against endwise movement by suitable lock nuts 169 threaded thereon, and the other end is provided with a reversible ratchet 170 operable by a hand lever 171 readily accessible from the front of the headstock 5. To provide means for indicating the degree of angular adjustment of headstock 5, the front face of the arcuate gear segment 162 is provided with a scale 172 (Fig. 30) graduated in degrees and half degrees. A pointer 173 on the headstock housing 157 is movable therewith along the graduated scale 172 to indicate accurately the setting of the headstock 5. Thus, oscillation of the hand lever 171 will be effective to swivel the headstock 5, the direction of swivel movement being determined by the setting of the reversible ratchet 170.

Figure 34:
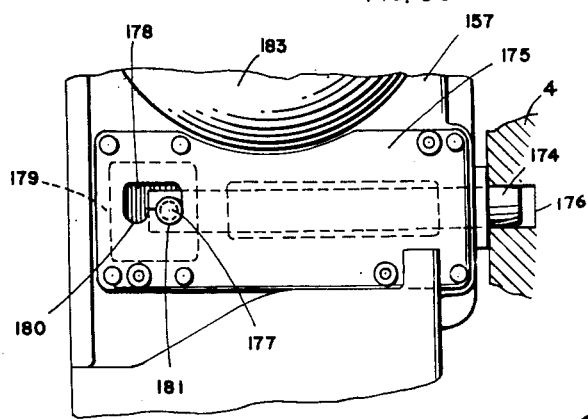
Fig. 34 is a fragmentary side vew illustrating an index pin for the headstock.

Means is also provided for positively locating the headstock 5 selectively at 15° increments over the range of swivel adjustment. In the present instance, the locating means comprises an index pin 174 (Fig. 34) which is slidably guided at opposite ends in a bearing sleeve 175 secured to the headstock housing 157. The rear end of the pin is adapted for end engagement selectively in any one of a series of arcuate arranged holes 176 in the front face of the head slide 4. To locate the index pin 174 either in locking position or in retracted position, a radial handle 177 is secured to the forward end of the pin and extends through an opening 178 in a locking plate 179 on the headstock housing 157 for manual actuation from the front of the machine. The lower edge of the opening 178 is formed with space arcuate notches 180 and 181 adapted to receive and restrain the handle 177 against shifting movement longitudinally of the pin. To engage the index pin 174 in one of the holes 176, the headstock housing 157 is swiveled through rotation of the worm 165 substantially into the desired position. The handle 177 is then lifted out of the forward notch 180, and actuated to shift the pin 174 rearwardly into the selected hole 176. The handle 177 is now lowered into the notch 181 so as to retain the pin 174 in locking engagement with the head slide 4. In disengaging the pin 174 to permit subsequent swivel adjustment of the headstock 5, the handle 177 is lifted out of the notch 181, then shifted forwardly, and then lowered into the notch 180.

After the headstock 5 has been swiveled into the desired angular position, whether in one of the 15° positions or any intermediate position as determined by the graduations on the scale 172, the housing 157 is securely clamped to the head slide 4. In the present instance, this may be accomplished by manually tightening suitable clamp nuts 182 (Fig. 5) on the forward or outer ends of the three bolts 160. In a modified form shown in Fig. 7, the nut 182 is adjustable on the bolt 160 through a small predetermined clearance between a washer 182a disposed against the housing 157 and a stop disk 182b rigidly secured to the outer end of the bolt. The disks 182b on the three bolts insure a definite, uniform and adequate movement of the nuts 182 to facilitate clamping and releasing the headstock 5.

Figure 4:
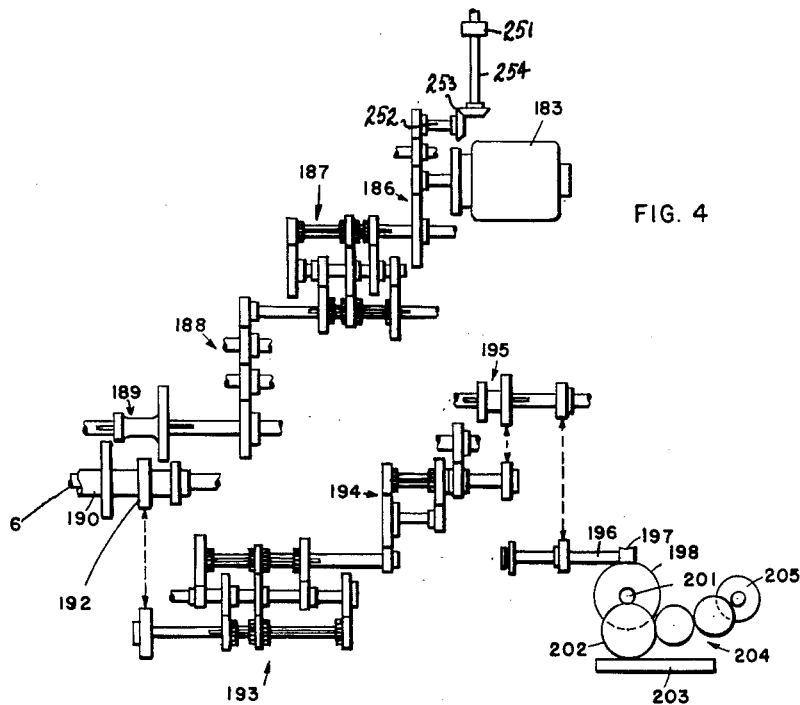
Fig. 4 is a diagrammatic view of the spindle speed and feed gear transmissions.
Figures 4A, 4B, 4C:
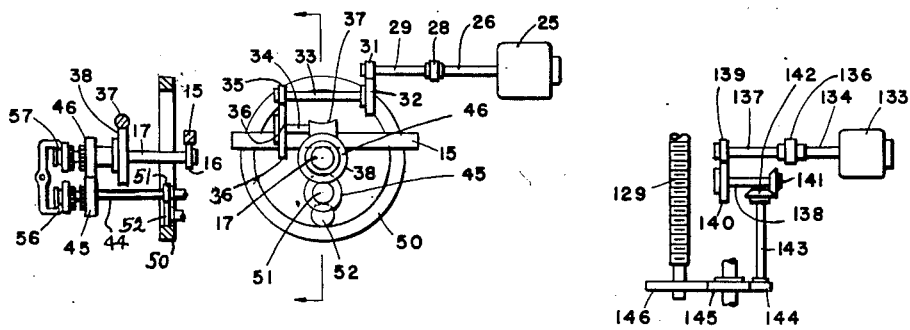
Figs. 4a and 4b are diagrammatic views of the gear drives for translating and rotatably adjusting the headstock column.
Fig. 4c is a diagrammatic view of the gear drive for the headstock elevating screw.

Incorporated in the headstock 5 are suitable variable speed transmissions for driving and feeding the spindle 6. These transmissions, to a considerable extent, may be conventional in construction, for example, as illustrated in Gallimore Patent No. 1,858,491, and hence are not disclosed in full detail. In general, the transmissions (Fig. 4) derive power from a constant speed reversible electric motor 183 mounted on the headstock housing 157, and are selectively adjustable to provide eighteen different rotary speeds over a predetermined speed range under the control of a speed selector 184 (Fig. 1), and eighteen different translatory feeds in relation to the spindle rotation over a predetermined feed range under the control of a feed selector 185 (Fig. 1). More particularly, and as illustrated diagrammatically in Fig. 4, the motor 183 is connected in series through a train of gears 186, a selective nine-speed gear mechanism 187, a train of gears 188, and a selective two-speed gear mechanism 189 to a spindle drive sleeve 190 journaled in the housing 157. The spindle 6 is splined at the outer end in the sleeve 190 for rotary drive therewith and for relative axial feed movement therein, and is journaled at the inner end in a coaxial ram 191 slidably supported in the housing 157.

The feed drive is taken from a gear 192, fixed on the spindle sleeve 190, and comprises in series a selective nine-speed gear mechanism 193, a selective two-speed mechanism 194, and a direction control mechanism 195 connected to a worm shaft 196. A worm 197 is fixed on the shaft 196 and meshes with a worm wheel 198 forming part of a master clutch member 199 for disengageable driving connection with a coaxial tubular shaft 200. A pinion 201 on the inner end of the shaft 200 is connected through an idler gear 202 to a gear rack 203 rigidly secured to the ram 191 for longitudinal movement therewith. The gear 202 is also connected through a train of gears 204 to a rotary tapping dial 205 (Figs. 1, 4) on the front of the headstock 5.

The master clutch 199 (Fig. 26) is available for establishing or interrupting the power feed drive, and has a turnstile 206 fixed to the shaft 200, and provided with hand levers 207, revoluble to effect rapid traverse by hand when the power drive is disconnected. More particularly, two clutch dogs 208 are radially slidable in the turnstile 206 for engagement with an internal ring clutch element 209 on the worm wheel 198, and are normally disengaged by coil compression springs 210. An actuating plunger 211 extends slidably through the tubular shaft 200, and has an enlarged portion on the forward end defining a conical cam face 212 adapted for coaction through balls 213 with the inner ends of the clutch dogs 208 to force the latter outwardly against the pressure of the springs 210. The hand levers 207 are provided with gear sectors 214 meshing with an annular rack 215 on the outer end of the plunger 211. In operation, pivotal movement of the hand levers 207 toward each other into their outermost position will shift the plunger 211 inwardly to bring the cam face 212 into engagement with the balls 213, thereby establishing the power drive. Pivotal movement in the reverse direction will shift the plunger 211 to move the cam face 212 out of engagement with the balls 213, thereby interrupting the power drive. Since the shaft 200 is always geared to the rack 203, rotation of the turnstile 206, either by power or manually, will translate the spindle ram 191.

Provision is made for locking the spindle 6 and ram 191 against axial movement when the power drive is disconnected and manual feed is not to be effected, so as to prevent such movement by gravity when the headstock 5 is adjusted into inclined position. To this end, a locking pawl 216 is pivotally mounted within the housing 157, and has a tooth 217 on the free end movable into and out of engagement with the pinion 201. A coiled tension spring 218 normally tends to urge the pawl 216 toward and into locking engagement. To disengage the pawl 216, a lifting plunger 219 extends through the pawl supporting bracket 220, and abuts the lower edge of the pawl adjacent the pivot. The plunger 219 is normally retracted by a spring 221, and seats on a ball 222 within a guide bore 223 opening to one side of the bore 224 in which the rear end of the clutch actuating plunger 211 is disposed. The plunger 211 is formed with a peripheral cam groove 225 which is movable into position to receive the ball 222 so as to release the pawl 216 for movement into locking position when the arms 207 are pivoted inwardly, away from each other, into an intermediate position to disengage the clutch 199. Upon movement of the plunger 211 out of intermediate position into either extreme end position, one side or the other of the groove 225 will cam the ball 222 out of the bore 224 to lift the pawl 216 out of locking engagement with the pinion 201. Thus, upon pivoting the arms 207 into their innermost position, the plunger 211 will be shifted into its outermost position to condition the spindle feed transmission for manual operation. A spring-actuated detent 226 is engageable with a second peripheral groove 227 in the plunger 211 to locate and retain the latter yieldably in the manual feed position. It will thus be seen that the plunger 211 has three positions, one for power feed, onother for manual feed, and an intermediate third to lock the spindle 6 in fixed axial position. The spindle 6 may be secured in any axial position by a hand clamp 228 (Fig. 2) operable from the front of the machine.

An automatic tapping device is provided for automatically reversing the feed drive for the spindle 6 at any predetermined depth of feed. The tapping device includes the depth indicating tapping dial 205 (Fig. 27) which is mounted on the front of the headstock housing 157, and which has an integral sleeve 229 journaled in and extending through the front housing wall. A drive shaft 230 extends through the sleeve 229, and has a gear 231 on the inner end forming part of the gear train 204. The extreme inner end 232 of the shaft 230 is journaled in a web 233 within the headstock 5.

The shaft 230 is adapted to be connected to the sleeve 229 for rotation therewith when the dial 205 has been set into the desired depth position. In the present instance, a radial locking pin 234 (Fig. 28) is slidable in the shaft 230 for engagement with the inner surface of the sleeve 229, and has a beveled end 235 in cam engagement with the inclined root surface of a notch 236 in the inner end of a locking plunger 237 slidable in an axial bore 238 in the shaft. A screw 239, with a hand knob 240, is threaded into the outer end of the bore 238. A compression spring 241 in the inner end of the bore 238 acts against the inner end of the plunger 237 to release the clamp when the screw 239 is turned out.

A trip button 242 (Fig. 27) is adapted to be secured for rotation with the dial 205 to actuate a reversing switch 243 in the circuits for the motor 183 when the feed has proceeded to the desired depth. In the present instance, the button 242 is fixed in a collar 244 rotatably adjustable on the inner end of the sleeve 229 and adapted to be secured thereto by a set screw 245. The switch has an actuating stem 246 urged outwardly by a spring 247 into the path of the button 242. It will be evident that the button 242 will engage the stem 246 to actuate the switch 243 so as to reverse the feed by reversing the motor 183 when the dial 205 has been turned through a distance determined by the initial depth setting.

The switch 243 is mounted within the housing 157, and has a reset stem 248 adapted to be actuated through a plunger 249 by a reset button 250 in the manual control panel 104 on the front of the headstock 5.

Figure 31:
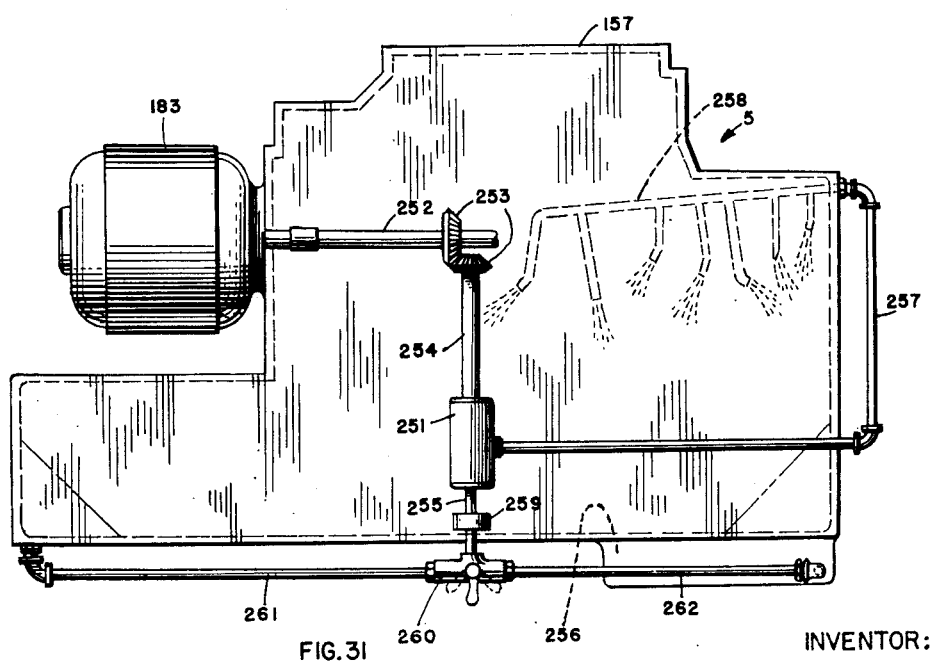
Fig. 31 is a rear elevational view, in outline, of the spindle headstock, and illustrating particularly the lubricating system.

Lubricant is supplied to the interior of the housing 157 by a pump 251 (see Fig. 31) driven from the headstock motor 183 through the gear train 186, a horizontal shaft 252, bevel gears 253 and a vertical shaft 254 to the pump shaft. The pump 251 has a suction line 255 adapted to be connected to the bottom interior of the housing 157 which constitutes an oil reservoir, and preferably is formed at the front end with a depressed sump 256 in the bottom wall. The pump 251 also has a discharge line 257 connected to a header 258 with a series of outlets from which streams of oil are cascaded over the gears, shafts and other moving parts within the housing. Branch tubes may be connected to the line 257 for directing oil to those portions of the spindle head not reached by the cascading oil.

In order to insure an adequate source of lubricant for the pump 251 in all positions of angular adjustment of the headstock 5, the suction line 255 is adapted to be connected through a filter 259, and selectively through a three-way hand valve 260 to one or the other of two branch lines 261 and 262 leading respectively to the sump 256 and the tail end of the housing 157. Thus, when the forward end of the housing 157 is horizontal or tilted upwardly, the valve 260 is adjusted to connect the suction line 255 to the line 262 leading to the back end of the reservoir wherein the body of oil will establish its level. Conversely, when the forward end is tilted downwardly, the pump 251 will be connected through the line 261 to the forward end of the sump 256.

A hand pump 263 is mounted on the head slide 4 and operable to provide lubricant to the guideways 126 of the slide.

It will be seen that I have provided a portable machine which is capable of performing a wide variety of metal removing operations, and which is compact and portable to permit movement of the machine as a unit from place to place as a convenience in operating upon certain kinds of work. The motors 25 and 133 for driving the base slide 2 and headstock 5 and swivelling the column 3 are mounted on the side of the column. The clamp motor 91 and the limit switches 105 and 105a for the base slide 2 are mounted on the latter. The spindle drive motor 183 and the clamp motor 155 for the head slide 4 are mounted on the headstock 5. The controls for all of these motors are all located on the front of the headstock housing 157 for ready and convenient accessibility to the operator. The necessary electric connections between the various motors, limit switches and control elements are enclosed and yet remain established for all swivel adjustments of the column 3 and the headstock 5.

I claim as my invention:

1. In a machine tool, in combination, a base frame, a base slide reciprocable on said frame, a column mounted on said slide for translation therewith and for rotary movement thereon through 360°, a drive transmission terminating in a pinion and an intermeshing rectilinear gear rack for translating said slide on said frame, a drive transmission terminating in a pinion and an intermeshing circular rack for rotating said column, a reversible variable-speed electric drive motor mounted on said column, a speed-reduction gear transmission within said column connected to said motor, selector clutches for connecting said gear transmission either to one or the other of said drive transmissions, and a clutch actuator for said selector clutches, said actuator serving as an interlock to prevent simultaneous engagement of said clutches.

2. In a machine tool, in combination, a horizontal base frame, a base slidable reciprocably on said frame, a vertical column mounted on said slide for translation therewith and for rotation through 360°, a drive transmission operable by a reversible variable-speed electric drive motor mounted on said column and having branches selectively available to translate said slide or to rotate said column, limit switches associated with said slide for controlling said drive motor to limit the extent of movement of said slide in either direction, control elements on said column for said motors, a coaxial drum on the lower end of said column supporting a plurality of electrical collector rings having circuit connections with said drive motor and with said control elements, and a plurality of electrical brushes mounted on the underside of said slide in wiping engagement with said rings and having circuit connections with said torque motor and said limit switches.

3. In a machine tool, in combination, a horizontal base frame, a slide reciprocable on said frame, a vertical column mounted on said slide for movement therewith and for rotation thereon through 360°, interrelated electrical units on said column and said slide, and means for establishing electric circuit connections between said units in all rotary positions of said column on said slide, said last mentioned means including a cylindrical depending coaxial drum on the lower end of said column, an insulating sleeve encircling said drum, a plurality of axially spaced electrical collector rings mounted on said sleeve and connected through electrical conductors to the electrical units on said column, a plurality of parallel insulating tubes mounted on the underside of said slide and extending longitudinally thereof toward one end, a plurality of electrical conducting rods extending slidably through said tubes and constituting brushes in wiping engagement respectively with said rings, the outer ends of said rods having terminal posts connected through electrical conductors to the electrical units on said slide, and spring means for maintaining said rods yieldably in wiping engagement with said rings.

4. In a machine tool, in combination, a horizontal base frame, a slide reciprocable on said frame, a vertical column mounted on said slide for movement therewith and for rotation thereon, interrelated electrical units on said column and said slide, and means for establishing circuit connections between said units in all rotary positions of said column on said slide, said last mentioned means including a cylindrical depending coaxial drum on the lower end of said column, a plurality of electrical collector rings mounted on said drum and connected through electrical conductors to the electrical units on said column, a plurality of insulating tubes mounted on the underside of said slide, and a plurality of electrical conducting rods extending slidably through said tubes and constituting brushes in wiping engagement respectively with said rings, said rods being connected through electrical conductors to the electrical units on said slide.

5. In a machine tool, in combination, a horizontal base frame, a slide reciprocable on said frame, a vertical column mounted on said slide for movement therewith and for rotation thereon, interrelated electrical units on said column and said slide, and means for establishing circuit connections between said units in all rotary positions of said column on said slide, said last mentioned means including a cylindrical depending coaxial drum on the lower end of said column, a plurality of electrical collector rings mounted on said drum and connected through electrical conductors to the electrical units on said column, and a plurality of electrical brushes in wiping engagement with said rings and connected through electrical conductors to the electrical units on said slide.

6. In a machine tool, in combination, a support, a movable member slidably guided on said support, and a cam actuated clamping device for securing said member to said support in any predetermined position of translation, said device comprising a draw bolt, a non-rotary cam element on said bolt, a rotary cam element on said bolt and coacting with said non-rotary cam element upon reverse rotation to clamp and release said bolt, a bar reciprocable on said member and connected to said rotary cam element and having an elongated transverse slot, a crank rotatably supported in said member and having a crank pin in operative engagement with said slot, a reversible torque motor mounted on said member, and a speed reduction gear drive transmission connecting said motor to said crank.

7. In a machine tool, in combination, a support, a movable member slidably guided on said support, and a plurality of clamping devices for securing said member to said support in any predetermined position of translation, a bar reciprocable on said member and operatively connected to said clamping device and having an elongated transverse slot, a crank rotatably supported in said member and having a crank pin in operative engagement with said slot, a reversible torque motor mounted on said member, and a worm and worm wheel drive connecting said motor to said crank.

8. In a machine tool, in combination, a vertical column, a head slide vertically movable on said column, a headstock mounted for swivel adjustment about a horizontal axis on said head slide and supporting a tool spindle extending perpendicularly to said axis, drive means including a reversible electric drive motor on said headstock for rotating and axially feeding said spindle, means for swiveling said headstock on said head slide to locate said spindle either in a horizontal position or with the forward end of said spindle inclined upwardly or downwardly, and forced feed lubricating means including an oil pump driven from said last mentioned motor, means arranged to supply lubricating oil to said pump in any position of swivel adjustment of said headstock, and means for directing oil from said pump to working parts of said spindle drive means within the interior of said headstock.

9. In a machine tool, in combination, a vertical column, a head slide vertically reciprocable on said column, power operated means for reciprocating said slide, a headstock having a housing mounted on said slide for swivel adjustment about a horizontal axis, a gear segment secured to said slide concentrically about said swivel axis, a worm journaled in fixed position on said housing and meshing with said gear segment, a reversible hand ratchet for rotating said worm whereby to swivel said housing, a graduated scale for indicating the angular position of said housing about the swivel axis, said slide being formed with an arcuate series of equally spaced apertures along said scale, a locking pin slidable in said housing and adapted to engage selectively in said apertures, and disengageable means for retaining said pin selectively in either retracted position or locking position, and a spindle journaled in said housing, said housing being adjustable to locate said spindle either horizontally or with the forward end inclined upwardly or downwardly.

10. In a machine tool, in combination, a vertical column, a head slide mounted on said column for vertical adjustment, power means for reciprocating said slide on said column, a headstock having a housing mounted on said slide for swivel adjustment about a horizontal axis, a spindle mounted in said housing for rotation and axial translation and extending transversely of said swivel axis, power drive transmissions within said housing for said spindle, said housing being adjustable about said swivel axis to locate said spindle either in a horizontal position or with the forward end inclined upwardly or downwardly, the bottom of said housing constituting an oil sump, means including a pump having a suction line and a discharge line for supplying oil to the working parts of the transmissions within said housing, and means for selectively connecting said suction line to either end of said sump depending on the angular position of said headstock housing.

11. In a machine tool, in combination, a vertical column, a head slide mounted on said column for vertical adjustment, power means for reciprocating said slide on said column, a headstock having a housing mounted on said slide for swivel adjustment about a horizontal axis, a spindle mounted in said housing for rotation and axial translation and extending transversely of said swivel axis, power drive transmissions within said housing for said spindle, said housing being adjustable about said swivel axis to locate said spindle either in a horizontal position or with the forward end inclined upwardly or downwardly, the bottom of said housing constituting an oil sump, means including a pump having a suction line and a discharge line for cascading oil over the working parts of the transmissions within said housing, two oil supply lines opening to opposite ends of the lower portion of said housing, and a three-way manual valve for selectively connecting said suction line to either end of said supply lines so as to take oil from the lowermost end of said housing.

12. In a machine tool spindle headstock, in combination, a supporting slide, a headstock housing mounted for swivel adjustment on said slide about a horizontal axis, a spindle journalled in said housing for rotary speed drive and for axial feed translation transversely of said axis, said housing being adjustable to swivel said spindle selectively either into horizontal position or inclined position, power drive means for rotating said spindle, latch means operable to lock said spindle against translation, and power drive means for translating said spindle and including a main clutch for closing or opening the drive connection, said clutch comprising an actuator adjustable selectively into one position to disengage said latch means and close said clutch for power drive, or into another position to disengage said latch means and open said clutch for manual translation of said spindle, or into a third position to open said clutch and engage said latch means to lock said spindle.

13. In a machine tool spindle headstock, in combination, a supporting slide, a headstock housing mounted for swivel adjustment on said slide, a spindle journalled in said housing for rotary speed drive and for axial feed translation transversely of the swivel axis, said housing being adjustable to swivel said spindle selectively either into horizontal position or inclined position, and power drive means for translating said spindle and including a main clutch having a driving element, a driven element and an actuator adjustable selectively to engage and disengage said elements, said drive means including a pinion in the drive connection from said driven element to said spindle, and a latch normally urged into engagement with said pinion to lock said spindle against translation, said actuator being operable to disengage said latch when said clutch is closed and either to disengage or permit engagement of said latch when said clutch is open.

14. In a machine tool spindle headstock, in combination, a supporting slide, a headstock housing mounted for swivel adjustment on said slide, a spindle journalled in said housing for rotary speed drive and for axial feed translation transversely of the swivel axis, said housing being adjustable to swivel said spindle selectively either into horizontal position or inclined position, and power drive means for translating said spindle and including a main clutch having a driving element, a driven element and an actuator adjustable selectively to engage and disengage said elements, said drive means including a pinion in the drive connection from said driven element to said spindle, and a pivotal latch movable into and out of interlocking engagement with the teeth of said pinion, said actuator comprising a shiftable plunger movable selectively into one end position to close said clutch and disengage said latch, an intermediate position to open said clutch and engage said latch, or opposite end position to open said clutch and disengage said latch.

15. In a machine tool, in combination, a horizontal base frame, a first movable member comprising a slide reciprocable on said frame, a second movable member comprising a vertical column mounted on said slide for movement therewith and for rotation thereon, interrelated electrical units on said column member and said slide member and means for establishing circuit connections between said units in all rotary positions of said column on said slide, said last mentioned means including a generally cylindrical drum on one of said members coaxial with said column and disposed at the lower end thereof, a plurality of electrical collector rings mounted on said drum and connected through electrical conductors to the electrical units on said one member, and a plurality of electrical brushes in wiping engagement with said rings and connected through electrical conductors to the electrical units on the other of said members.

16. In a machine tool, the combination of a base frame, a base slide reciprocably mounted on said frame, a column mounted on said slide for translation therewith and for rotary movement thereon, a slide translating drive transmission terminating in coacting translatory motion producing elements on said slide and said frame, a column rotating drive transmission terminating in coacting rotary motion-producing elements on said column and said slide, a drive motor mounted on said column, a power transmission disposed within said column and connected to said motor, selector clutches interposed between said power transmission and said respective drive transmissions for selectively engaging said power transmission with either of the latter transmissions, and a common actuator interconnected with said clutches and serving as an interlock preventing simultaneous engagement thereof.

17. In a machine tool, the combination of a base frame, a base slide mounted on said frame for reciprocation thereon, an upright support column mounted on said slide for translation therewith and for rotary movement thereon, a slide translating drive transmission disposed within said column and including a central drive shaft coaxial with the axis of rotation of said column and extending into driving relation with said frame, a column rotating drive transmission disposed within said column and including a drive shaft parallel with said central drive shaft and drivingly engaged with said slide, a drive motor, a power transmission connected to said motor and extending into said column, and selector clutches interposed between said power transmission and said respective drive shafts to selectively engage said power transmission with said shafts for translating said slide and rotating said column.

18. In a machine tool, the combination of a base frame, a base slide slidably mounted on said frame for translation thereon, a column mounted on said frame for translation therewith and rotation thereon, a slide translating mechanism including a first elongated drive shaft disposed within said column and interconnected at one end with coacting translatory motion-producing elements on said slide and said frame, a column rotating mechanism including a second elongated drive shaft disposed within said column in generally parallel relation to said first drive shaft and interconnected at one end with coacting rotary motion-producing elements on said column and said slide, rotary drive sleeves concentric about said respective shafts, means rotatably interconnecting said sleeves with each other, a common power transmission interconnected with one of said sleeves, and selector clutches interposed between said respective sleeves and the shafts associated therewith to interengage said power transmission with said respective shafts for translating said slide and rotating said column.

19. In a machine tool, the combination of a base frame, a base slide mounted on said frame for reciprocation thereon, an upright support column mounted on said slide for translation therewith and for rotary movement thereon, a slide translating drive transmission disposed within said column and including a first substantially vertical drive shaft coaxial with the axis of rotation of said column and depending into driving relation with said frame, a column rotating drive transmission disposed within said column and including a second elongated drive shaft positioned in generally parallel relation to said first drive shaft and interconnected at the lower end with coacting rotary motion-producing elements on said column and said slide, rotary drive sleeves concentric about said respective shafts, means rotatably interconnecting said sleeves with each other, a common driving motor, a power transmission interconnected between said motor and one of said sleeves at a position thereon intermediate the ends of one of said shafts disposed therein, two selector clutches interposed between said sleeves and the ends of the respective drive shafts received therein to engage said power transmission with said respective shafts for translating said slide and rotating said column, and a common actuator interconnected with said clutches and serving as an interlock preventing simultaneous engagement of both clutches.

EVERETT E. HOSEA.

REFERENCES CITED

The following references are of record in the file of this patent:

UNITED STATES PATENTS

| Number | Name | Date |
| --- | --- | --- |
| 1,676,206 | Ratliff | July 3, 1928 |
| 1,696,660 | Wegner | Dec. 25, 1928 |
| 1,706,824 | Schatz et al. | Mar. 26, 1929 |
| 2,012,249 | Sassen | Aug. 20, 1935 |
| 2,075,489 | Warner et al. | Mar. 30, 1937 |
| 2,123,825 | DeVlieg | July 12, 1938 |
| 2,202,766 | Trosch | May 28, 1940 |
| 2,206,031 | Drissner et al. | July 2, 1940 |
| 2,224,108 | Ridgway | Dec. 3, 1940 |
| 2,242,293 | Eden et al. | May 20, 1941 |
| 2,251,015 | Gallimore | July 29, 1941 |
| 2,251,016 | Gallimore | July 29, 1941 |
| 2,286,821 | Libby | June 16, 1942 |
| 2,307,222 | Johnson | Jan. 5, 1943 |
| 2,310,870 | Retterath | Feb. 9, 1943 |
| 2,333,589 | Schauer | Nov. 2, 1943 |
| 2,341,061 | Rhodes et al. | Feb. 8, 1944 |
| 2,342,829 | Armitage | Feb. 29, 1944 |
| 2,355,677 | Ransome | Aug. 15, 1944 |